US012596791B1

(12) United States Patent
Ordo et al.

(10) Patent No.: US 12,596,791 B1
(45) Date of Patent: Apr. 7, 2026

(54) SECURITY FOR COMPUTING CLOUDS

(71) Applicant: RockSteady Cloud Ltd., Tel Aviv (IL)

(72) Inventors: Gal Ordo, Tel Aviv (IL); Amit Megiddo, Srigim Li-On (IL); Eyal Faingold, Kfar Saba (IL)

(73) Assignee: RockSteady Cloud Ltd., Tel Aviv (IL)

( * ) Notice: Subject to any disclaimer, the term of this patent is extended or adjusted under 35 U.S.C. 154(b) by 0 days.

(21) Appl. No.: 19/093,328

(22) Filed: Mar. 28, 2025

(51) Int. Cl.
| | |
|---|---|
| *G06F 9/44* | (2018.01) |
| *G06F 8/61* | (2018.01) |
| *G06F 8/76* | (2018.01) |
| *G06F 9/445* | (2018.01) |
| *G06F 9/45* | (2006.01) |
| *G06F 9/455* | (2018.01) |
| *G06F 21/12* | (2013.01) |
| *G06F 21/54* | (2013.01) |

(52) U.S. Cl.
CPC ............... *G06F 21/54* (2013.01); *G06F 8/61* (2013.01); *G06F 8/76* (2013.01); *G06F 21/12* (2013.01)

(58) Field of Classification Search
CPC ... G06F 8/61; G06F 8/67; G06F 21/12; G06F 21/54
See application file for complete search history.

(56) References Cited

U.S. PATENT DOCUMENTS

| | | | | |
|---|---|---|---|---|
| 10,318,285 B1 * | 6/2019 | Jodoin | ................ | G06F 11/3688 |
| 11,416,587 B1 * | 8/2022 | den Hartog | ............. | G06F 21/53 |
| 12,126,644 B2 * | 10/2024 | Seetharamaiah | ... | H04L 63/1425 |
| 12,355,626 B1 * | 7/2025 | Varakantam | ........ | G06F 16/9537 |
| 2017/0357805 A1 * | 12/2017 | Soeder | .................... | G06F 21/54 |
| 2022/0147636 A1 * | 5/2022 | Mahuli | ................. | G06F 21/577 |

(Continued)

FOREIGN PATENT DOCUMENTS

WO WO-2024057103 A1 * 3/2024 ............... G06F 8/60

OTHER PUBLICATIONS

Jose Maria Jorquera Valero, Securing Networks of the Future: A Programmable Security Monitoring Platform for Cloud Continuum, 2024, pp. 1-6. https://ieeexplore.ieee.org/stamp/stamp.jsp?tp= &arnumber=11028737 (Year: 2024).*

(Continued)

*Primary Examiner* — Mongbao Nguyen

(57) ABSTRACT

A computer implemented method of automatic provisioning of cloud-specific security services on computing clouds, comprising: analyzing datasets collected by code sensors monitoring cloud-specific security services and/or security resources running in computing clouds of a common entity, generating a technical architecture to implement across the security services and/or security resources on computing clouds according to the analysis, computing architectural adaptations to the cloud-specific security services and/or security resources for normalizing current architectures to generate the technical architecture in each of the cloud-specific security services and/or security resources of the cloud-specific computing clouds, and generating code-scripts according to the architectural adaptations for installation at corresponding cloud-specific security service and/or security resource running on each corresponding computing cloud for implementing the technical architecture across the computing clouds of the common entity.

25 Claims, 6 Drawing Sheets

(56)        References Cited

U.S. PATENT DOCUMENTS

| | | | |
|---|---|---|---|
| 2022/0198322 A1* | 6/2022 | Kuperman | H04L 63/1441 |
| 2022/0222053 A1* | 7/2022 | Mishra | G06F 8/65 |
| 2023/0409408 A1* | 12/2023 | Walshe | G06F 9/5077 |
| 2024/0028308 A1* | 1/2024 | Lee | G06F 8/34 |
| 2025/0021663 A1* | 1/2025 | Katz | G06F 8/4434 |
| 2025/0036403 A1* | 1/2025 | Ballantyne | G06F 8/61 |
| 2025/0061203 A1* | 2/2025 | Datta | G06F 9/45558 |
| 2025/0068397 A1* | 2/2025 | Kandasamy | G06F 8/35 |
| 2025/0119459 A1* | 4/2025 | Aguiar | H04L 63/1425 |
| 2025/0193249 A1* | 6/2025 | Patnala | H04L 63/1425 |
| 2025/0272428 A1* | 8/2025 | Srinivasan | G06F 21/6245 |

OTHER PUBLICATIONS

Li Yang, Enabling AutoML for Zero-Touch Network Security: Use-Case Driven Analysis, 2024, 3555-3579. https://ieeexplore.ieee.org/stamp/stamp.jsp?tp=&arnumber=10472316 (Year: 2024).*
Jose Maria, Securing Networks of the Future: A Programmable Security Monitoring Platform for Cloud Continuum, 2024, pp. 1-6. https://ieeexplore.ieee.org/stamp/stamp.jsp?tp=&amnumber=11028737 (Year: 2024).*

\* cited by examiner

Collect dataset 202

Analyze datasets 204

Generate technical architecture 206

Compute architectural adaptations 208

Generate code-scripts 210

Install code-scripts 212

Iterate
(e.g., monitor)
214

SECURITY FOR COMPUTING CLOUDS

BACKGROUND

The present invention, in some embodiments thereof, relates to cloud computing and, more specifically, but not exclusively, to systems and methods for securing computing clouds.

Provisioning of computing clouds for security may refer to the process of allocating and/or configuring cloud resources, for example, security tools, security policies, firewalls, and the like.

SUMMARY

According to a first aspect, a computer implemented method of automatic provisioning of a plurality of cloud-specific security services on a plurality of computing clouds, comprising: analyzing a plurality of datasets collected by a plurality of code sensors monitoring a plurality of cloud-specific security services and/or security resources running in a plurality of computing clouds of a common entity, generating a technical architecture to implement across the plurality of security services and/or security resources on the plurality of computing clouds according to the analysis, computing a plurality of architectural adaptations to the plurality of cloud-specific security services and/or security resources for normalizing current architectures to generate the technical architecture in each of the plurality of cloud-specific security services and/or security resources of the plurality of cloud-specific computing clouds, and generating a plurality of code-scripts according to the plurality of architectural adaptations for installation at corresponding cloud-specific security service and/or security resource running on each corresponding computing cloud for implementing the technical architecture across the plurality of computing clouds of the common entity.

According to a second aspect, a system for automatic provisioning of a plurality of cloud-specific security services on a plurality of computing clouds, comprising: at least one processor executing a code for: analyzing a plurality of datasets collected by a plurality of code sensors monitoring a plurality of cloud-specific security services and/or security resources running in a plurality of computing clouds of a common entity, generating a technical architecture to achieve across the plurality of security services and/or security resources on the plurality of computing clouds according to the analysis, computing a plurality of architectural adaptations to the plurality of cloud-specific security services and/or security resources for normalizing current architectures to generate the technical architecture in each of the plurality of cloud-specific security services and/or security resources of the plurality of cloud-specific computing clouds, and generating a plurality of code-scripts according to the plurality of architectural adaptations for installation at corresponding cloud-specific security service and/or security resource running on each corresponding computing cloud for implementing the technical architecture across the plurality of computing clouds of the common entity.

According to a third aspect, a non-transitory medium storing program instructions for automatic provisioning of a plurality of security services on a plurality of computing clouds, which when executed by at least one processor, cause the at least one processor to: analyze a plurality of datasets collected by a plurality of code sensors monitoring a plurality of cloud-specific security services and/or security resources running in a plurality of computing clouds of a common entity, generate a technical architecture to achieve across the plurality of security services and/or security resources on the plurality of computing clouds according to the analysis, compute a plurality of architectural adaptations to the plurality of cloud-specific security services and/or security resources for normalizing current architectures to generate the technical architecture in each of the plurality of cloud-specific security services and/or security resources of the plurality of cloud-specific computing clouds, and generate a plurality of code-scripts according to the plurality of architectural adaptations for installation at corresponding cloud-specific security service and/or security resource running on each corresponding computing cloud for implementing the technical architecture across the plurality of computing clouds of the common entity.

In a further implementation form of the first, second, and third aspects, further comprising: receiving a security objective written in a natural language from a user via a user interface, and generating the technical architecture for implementing the security objective across the plurality of security services and/or security resources.

In a further implementation form of the first, second, and third aspects, further comprising automatically installing each code-script of the plurality of code-scripts within the corresponding cloud-specific security service and/or security resource running on each corresponding computing cloud.

In a further implementation form of the first, second, and third aspects, installing automatically is selected from: (i) application programming interface (API) invocation, and (ii) generation of infrastructure-as-code (IaC) dataset and creating a push request for the IaC.

In a further implementation form of the first, second, and third aspects, the plurality of code-scripts are generated and/or installed in response to a single click by a user via a user interface.

In a further implementation form of the first, second, and third aspects, the plurality of architectural adaptations are at a devop level.

In a further implementation form of the first, second, and third aspects, the technical architecture defines a security objective, and the plurality of architectural adaptations are for one or more of: segmenting environments, creating preventive security policies configuring a firewall, deploying an application stack, provisioning a sandbox environment with limited access for testing, connections and/or dataflows between the plurality of cloud-specific security services and/or security resources, setting up autonomous response workflows for breaches, ensuring security tools are set up in conjunction with the types of cloud workflows set, setting up perimeter access for third-parties, and provisioning accounts and identities on behalf of customers.

In a further implementation form of the first, second, and third aspects, the plurality of architectural adaptations include allocation of at least one cloud-specific security service and/or security resource.

In a further implementation form of the first, second, and third aspects, the plurality of datasets collected by the plurality of sensors include at least one of: which entities are using each respective computing cloud, what each entity is doing in each computing cloud, when each entity used each respective computing cloud, and/or billing for correlation with usage.

In a further implementation form of the first, second, and third aspects, the plurality of datasets collected by the plurality of sensors include at least one of: what code is running in each respective computing cloud, what third parties are accessing in each respective computing cloud, what applications are running in each respective computing cloud, at least one technical architecture, security service configurations, cloud usage patterns, billing configurations, and security resource configurations.

In a further implementation form of the first, second, and third aspects, the plurality of code sensors are granted control-plane access, wherein data-plane access is denied for the plurality of code sensors, such that the plurality of code sensors are excluded from accessing data stored within the plurality of cloud-specific security services and/or security resources.

In a further implementation form of the first, second, and third aspects, the plurality of code sensors are selected from: installing a stack on a management account which installs a dataset that includes permissions for rolling out to selected member account, adding an application to the respective computing cloud and running a script to grant permission to the application to collect a dataset, and granting permission to a security service account to access the respective computing cloud.

In a further implementation form of the first, second, and third aspects, at least one code-script of the plurality of code-scripts is generated and/or installed as at least one of: (i) an infrastructure-as-code (IaC) template complying with at least one IaC format, (ii) via a pipeline, and (ii) via an integration with a software development kit (SDK) of a provider of a computing cloud running the respective cloud specific security service and/or security resource and calling a API for installing the at least one code-script.

In a further implementation form of the first, second, and third aspects, at least one code-script of the plurality of code-scripts is installed.

In a further implementation form of the first, second, and third aspects, the plurality of datasets are obtained by using a queue-based approach to query cloud service provider (CSP) application programming interfaces (APIs) for each account and/or region and/or security service and/or security resource, wherein each queue entry acts as an independent work process that can be processed in parallel.

In a further implementation form of the first, second, and third aspects, analyzing the plurality of datasets comprises performing multiple layer analysis for mapping an environment's policies, security service usage, and dependencies, aggregating outcomes of the multiple layer analysis, wherein the technical architecture is generating according to the aggregated outcomes.

In a further implementation form of the first, second, and third aspects, analyzing comprises mapping the plurality of cloud-specific security services and/or security resources to categories associated with objectives, wherein the technical architecture is generated according to the mapped categories.

In a further implementation form of the first, second, and third aspects, further comprising simulating impact of installing the plurality of code-scripts, computing at least one metric according to the simulation, and automatically installing the plurality of code-scripts in response to the at least one metric meeting at least one target requirement.

In a further implementation form of the first, second, and third aspects, further comprising, in response to the installation of the plurality of code-scripts for implementing the technical architecture, analyzing the plurality of datasets for detecting drift from the generated technical architecture, and automatically re-computing the plurality of architectural adaptations for resolving the drift.

In a further implementation form of the first, second, and third aspects, further comprising, in response to the installation of the plurality of code-scripts for implementing the technical architecture, and analyzing the plurality of datasets for detecting compliance with the generated technical architecture.

In a further implementation form of the first, second, and third aspects, the analyzing the plurality of dataset is performed in near real-time for near-real time detection of drift.

In a further implementation form of the first, second, and third aspects, the technical architecture comprises a common technical architecture to achieve across the plurality of security services on the plurality of computing clouds.

In a further implementation form of the first, second, and third aspects, the plurality of computing clouds include a plurality of computing environments within a same provider or across a plurality of providers.

In a further implementation form of the first, second, and third aspects, further comprising: connecting to an environment of the common entity for accessing customized security policies of the common entity, mapping a first set of the customized security policies to at least one predefined template, for a second set of the customized security policies which are non-mapped, analyzing the second set using machine learning models and/or artificial intelligence models to provide names and/or descriptions in natural language, and matching to similar customized security policies of the common entity, wherein the technical architecture is generated for the first set according to the at least one predefined template and for the second set according to the matches similar customized security policies.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
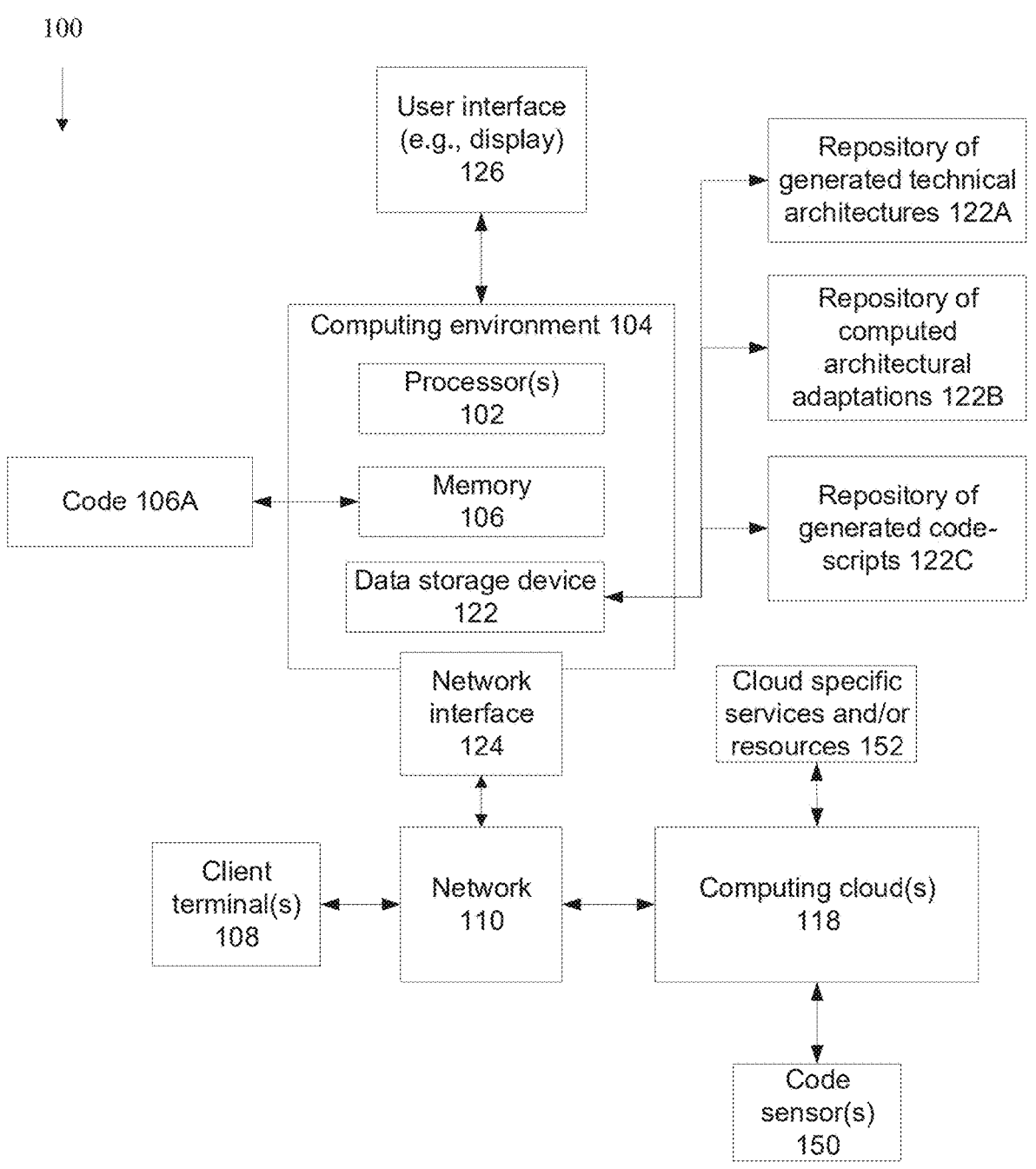
FIG. 1 is a block diagram of components of a system for automatic provisioning of multiple services on multiple computing clouds, in accordance with some embodiments of the present invention.

The present invention, in some embodiments thereof, relates to cloud computing and, more specifically, but not exclusively, to systems and methods for provisioning of computing clouds.

As used herein, in the context of provisioning described herein, the term computing cloud refers to computing environments within a same provider or across multiple different providers. In the context of provisioning, the term computing cloud is not meant to refer to the provider, and/or not meant to refer to the computing services within the computing cloud, which are not directly impacted by embodiments described herein.

As used herein, the term code-script is meant as an exemplary and not necessarily limiting example of an implementation of code. Other implementations of code may be substituted for the term code-script.

As used herein, the term automatic provisioning refers at least to the feature of automatic generation of code-scripts. The code-scripts may be automatically installed, and/or manually installed. The code-scripts may be automatically installed, for example, via direct application programming interface (API) integrations, and/or automatically deployed through code pipelines. The code-scrips may be manually installed, for example, according to automatically generated step-by-step instructions that may match the customized code-script generated on behalf of the user.

As used herein, the term user and common entity are sometimes interchanged. For example, the user may be of the common entity. Such as the common entity is a group of different end users (e.g., users of an organization), and the user is a security professional that manually installs the generated code-scripts described herein.

As used herein, the term policy and technical architecture may sometimes be interchanged. The technical architecture may be for implementing the policy, firewall, and/or other security tool architecture.

An aspect of some embodiments of the present invention relates to systems, methods, computing devices, and/or code instructions for automatic provisioning of cloud-specific services and/or resources on computing clouds, for example, cloud-specific security services and/or security resources. Datasets are collected by code sensors monitoring the cloud-specific services and/or resources running in the computing clouds of a common entity. The datasets may include, for example, configuration and/or usage information. The datasets may exclude data stored in the cloud environment of the user. The dataset are analyzed. A technical architecture (e.g., of a policy and/or objective) to implement across the cloud-specific services and/or resources on the computing clouds is generated according to the analysis. Architectural adaptations to the cloud-specific services and/or resources are computed. The architectural adaptation are for adapting current architectures to generate the technical architecture in each of the cloud-specific services and/or resources of the computing clouds. The architectural adaptations may represent tailored recommendations to the particular cloud environment of the common entity. The architectural adaptations may be designed for integration with existing cloud environments no matter what is installed on them, by adapting to the cloud environment. Users are not necessarily required use empty and/or greenfield environments. Code-scripts are generated according to the architectural adaptations for installation at corresponding cloud-specific services and/or resources running on each corresponding computing cloud for implementing the technical architecture across the computing clouds of the common entity.

Users (e.g., of the common entity) may provide one or more objectives (e.g., security objectives) and/or one or more policies (e.g., security policies) in natural language, which is translated to a technical architecture for implementing the security objective across the security services and/or security resources, as described herein.

Exemplary approaches for installation of the code-scripts include:

Providing infrastructure-as-code (IaC) code, which may be manually installed by the user.

Automatically doing a push request for the IaC on behalf of the user, for example, for installation through CI/CD (continuous integration/continuous deployment) processes.

Integrating with cloud providers' software development kits (SDK), and performing API calls (e.g., on behalf of the user when appropriate permissions are granted). This installation option may be performed fully automatically, without manual input by the user after onboarding (e.g., to the computing environment described herein).

Generating and/or providing a step-by-step process of how the code-scripts work, optionally together with a detailed explanation of why (i.e., the reason) the code-scripts were built the way that they were built. It is noted that the explanation of the reason the code-scripts were built may be important, for example, since in the code-scripts may include dozens of steps.

At least one embodiment described herein addresses the technical problem of managing multiple cloud-specific services and/or resources running in computing clouds of a common entity, for example, a single user, or a group of multiple users. At least one embodiment described herein improves the technology of tools for managing multiple cloud-specific services and/or resources, optionally cloud-specific security services and/or security resources running in computing clouds of a common entity. At least one embodiment described herein improves over existing approaches for managing multiple cloud-specific services and/or resources running in computing clouds of a common entity, which are mostly based on manual approaches by users, for example, cloud security, DevOps, and governance teams.

At least one embodiment described herein relates to a platform designed to optimize and/or operationalize cloud provider native capabilities (e.g., security, networking) across multiple providers At least one embodiment described herein relates to a platform designed to provision (e.g., secure, provide networking services) for multi-cloud environments using provider-native capabilities, optimized and operationalized using the platform. In the context of security of the computing clouds, the term optimized may refer to providing the best security coverage for users of the computing clouds for the least possible cost.

At least one embodiment described herein relates to a multi-cloud operating system that simplifies the management and operationalization of cloud-native security capabilities.

A potential advantage of at least one embodiment described herein relates to provisioning of native cloud capabilities to build and/or operate secure-by-design environments, reduce reliance on third-party tools, and/or optimize spending on services.

Cloud providers may offer robust security capabilities and may be uniquely positioned to secure customer environments due to several key advantages, for example:

Differentiated Security Value: Built directly into the cloud infrastructure, native services leverage internal APIs, proprietary logs, and unparalleled visibility into the threat landscape at scale. These elements enable the native services to deliver superior prevention and detection capabilities.

Operational Excellence and Compliance: Using cloud-native services minimizes vendor sprawl and associated supply chain risks, ensures global availability across regions and partitions, and adheres to stringent compliance standards.

Cost-Effectiveness: Cloud providers can offer services at significantly lower costs because they run on their own infrastructure. Additionally, providers are incentivized to lower prices—or even offer free features—to secure their platforms and/or protect their core business. Many native security capabilities are also included in enterprise discount or committed spend programs, further enhancing their value.

Despite these advantages, customers often struggle to fully leverage native services due to several challenges. Configuring, managing, and operationalizing these services requires deep expertise, along with significant setup and maintenance efforts. Each service is highly complex, with numerous configuration options and frequent updates. This is amplified as native services often operate in silos, lacking cohesion as a unified platform. Additionally, understanding and predicting costs is extremely challenging, with thousands of pricing dimensions adding to the friction. Managing services (e.g., security, network) across multiple providers introduces further complexity due to disparate tools, concepts, and workflows, which demand high level of expertise in each environment—even in secondary and tertiary environments.

At least one embodiment addresses the aforementioned technical challenges by acting as an operating system for cloud-native services (e.g., security capabilities, networking) making it easy for customers to unlock their full value. For example:

Unified Multi-Cloud User Experience: Provides a cloud-agnostic interface where security capabilities are managed through objective-driven language. These objectives are automatically mapped to services and capabilities across different computing cloud providers.

Tailored Recommendations: Continuously learning from the environments and delivering tailored service recommendations that are based on cloud usage. These simplify the process of consistently and safely updating service (e.g., security, networking) architectures and highlight new service capabilities to adopt.

Streamlined Operations: Eliminating the friction of using native services by offering a variety of deployment options, from tailor-made Infrastructure-as-Code (IaC) templates to single-click deployments. All managed capabilities come with built-in, end-to-end operationalization support.

Spend Visibility and Optimization: Simplifying cost management by providing actionable cost insights and predictability. Users can easily view their native service spending across environments, see trends over time, and access tailored cost optimization recommendations. This ensures informed decision-making and removes the friction from adopting new security services.

At least one embodiment described herein enables visualizing policy gaps, for example, missing policies in specific AWS accounts or discrepancies between AWS and GCP. At least one embodiment described herein generates recommendations to optimize existing policies and/or install new policies such as for maximum security protection. Safe deployment may be ensured through tailor-made rollout strategies. In addition to its built-in policy recommendation, optimization, and visualization engines—already available for use—at least one embodiment described herein may provide enhanced capabilities for the end-to-end management of policies.

At least one embodiment described herein provides a solution for the aforementioned technical problem by, and/or improves upon the aforementioned technical field by, and/or improves upon the aforementioned prior approaches by, and/or provides the practical application of, automatically generating code-scripts for installation at corresponding cloud-specific services and/or resources running on each corresponding computing cloud. Datasets are collected by code sensors monitoring the cloud-specific services and/or resources running in the computing clouds of a common entity. The dataset are analyzed. A technical architecture to implement across the cloud-specific services and/or resources on the computing clouds is generated according to the analysis. Architectural adaptations to the cloud-specific services and/or resources are computed. The architectural adaptation are for adapting current architectures to generate the technical architecture in each of the cloud-specific services and/or resources of the computing clouds. The code-scripts are generated according to the architectural adaptations for installation at corresponding cloud-specific services and/or resources running on each corresponding computing cloud for implementing the technical architecture across the computing clouds of the common entity.

The combination of parallelized data processing, layered analysis, and/or aggregated visualization, described herein, may help ensure smooth scaling and/or providing consistent, actionable insights in large, complex computing cloud environments that can potentially contain multiple groups (e.g., organizations) and/or tenants from various providers, on the order of thousands of accounts.

Exemplary use cases of different technical challenges and potential solutions and/or potential advantages based on at least one embodiment are now described:

Threat Detection: Preventing threats from escalating into business-impacting incidents is a significant challenge. Across providers, dozens of configurable threat detection capabilities generate hundreds of alert types. Responding to these alerts often requires complex cross-service and cross-provider integrations, leading to delays in threat mitigation. At least one embodiment described herein may be used for ensuring that required threat detection capabilities are deployed across providers, providing cost-optimized coverage for runtime, log monitoring, and malware detection. Alerts may be routed to operational and/or business owners via existing workflow management systems to accelerate response times. Additionally, automated responses to threats may be established, such as quarantining compute instances used for crypto-mining and/or dynamically updating firewalls to block malicious activities, all while considering the business and operational context to prevent disruptions.

Cloud Security Posture Management (CSPM) and Vulnerability Scanning: Managing vulnerabilities and misconfigurations is a significant technical challenge. Across providers, configurable capabilities can generate tens of thousands of findings weekly when correctly aligned with cloud usage. Quick responses are critical to preventing these risks from escalating into active threats, but the sheer volume, combined with the complexity and agility of customer environments, often delays action. At least one embodiment described herein may be used for ensuring required CSPM and vulnerability management capabilities are correctly deployed across providers, providing optimization insights for cost and operational efficiency, and routing alerts to relevant owners through existing workflow management systems. Automated remediation and risk-reduction mechanisms may be orchestrated using built-in cloud tools, while ensuring that these actions do not disrupt running workloads.

Protecting the cloud network perimeter, safeguarding web applications from exploits and DDoS attacks, and ensuring proper segmentation between cloud environments is technically challenging. These are compounded by the availability of dozens of services aimed at addressing these issues. At least one embodiment described herein optimizes the use of tools like Network Firewall, WAF, DNS Firewall, and DDoS Protection across environments, identifying environments missing these tools as part of their optimal architecture, and streamlining their deployment and ongoing management. At least one embodiment may help ensure network segmentation by automating policies that isolate accounts and environments at the network layer. For example, policies to restrict network access between production and non-production environments may be implemented.

Cloud providers offer various policy engines that may be supported by at least one embodiment described herein, for example, AWS Service Control Policies, Resource Control Policies, Declarative Policies, and VPC Endpoint Policies; Azure Policies and Azure Network Security Perimeter; and GCP Organization Policies and VPC Service Controls. Using existing approaches and/or existing tools, implementing preventive policies across clouds poses significant challenges. For example, cloud provider concepts differ in terminology and implementation mechanisms, requiring users to master granular technical details for each cloud provider. Additionally, gaps in supporting features make it difficult to streamline policy deployment and ongoing management. These gaps include for example, visualizing which policies are deployed across environments, tailoring recommended policies and rollout processes to customer environments, simulating and analyzing policy impact, versioning and rollback, detecting drift, managing exceptions, and testing policies to ensure they behave as intended. Lacking these features, users often underutilize the full potential of preventive policies.

At least one embodiment relates to quickly deploying and/or managing best-practice security policies tailored to their environments on an ongoing basis. These policies enable users to achieve key security outcomes such as:

Reduce attack surfaces: Manage approved regions and restrict cloud footprints.

Enforce data protection: Require encryption at rest and in transit, and place guardrails on the manipulation of sensitive data.

Control external access: Block anonymous or public access, manage approved third parties, and designate accounts inaccessible from external environments.

Ensure compliance: Establish preventive policies to ensure the environment consistently adheres to compliance requirements.

At least one embodiment provides a comprehensive inventory of native services (e.g., security, networking), normalized across providers. This feature enables users to view and/or manage equivalent security services across providers through a unified interface, ensuring consistent security coverage. For example, user may view and/or manage native threat detection capabilities, such as Amazon GuardDuty, Google Security Command Center, and Microsoft Defender Threat Detection. Users may visualize where these services are enabled directly on the organization tree and manage equivalent threat protection plans simultaneously. Additionally, this feature may help identify environments where neither native nor third-party equivalent capabilities are installed, avoiding potential security coverage gaps.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
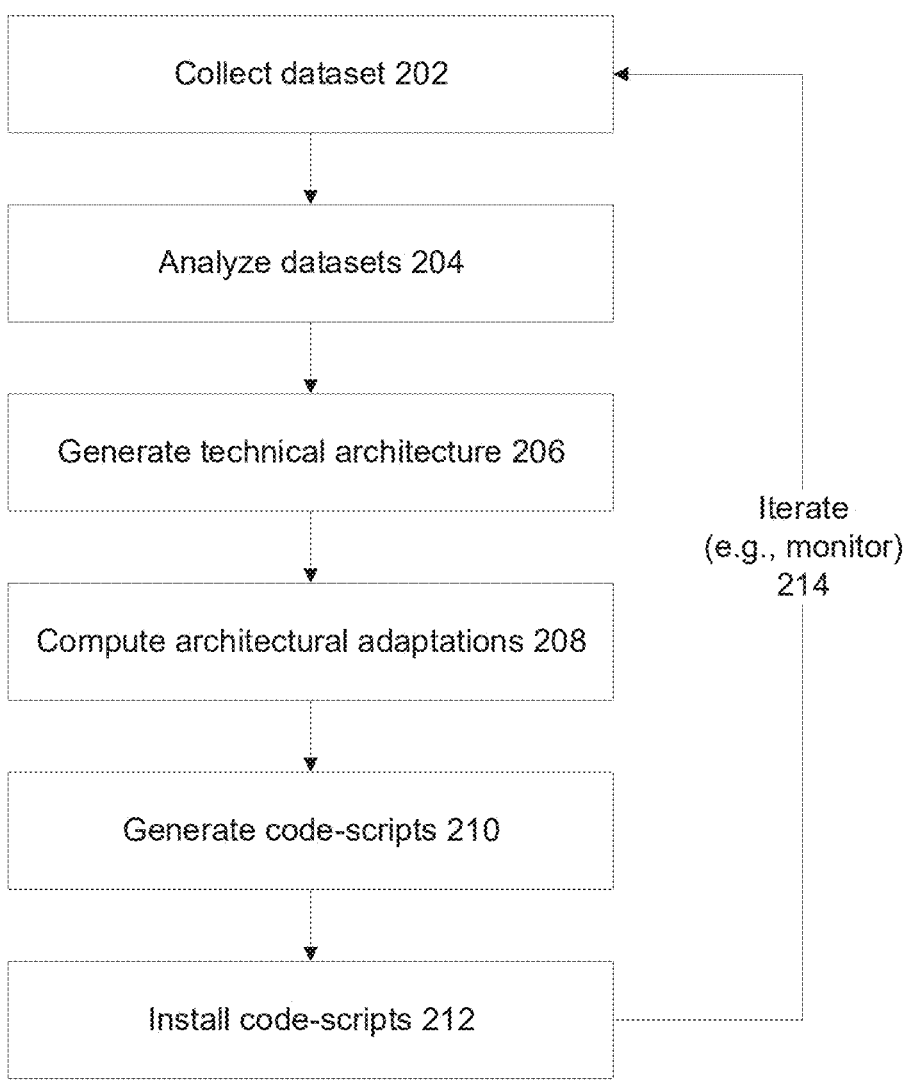
FIG. 2 is a flowchart of a method of automatic provisioning of multiple services on multiple computing clouds, in accordance with some embodiments of the present invention.
Figure 3:
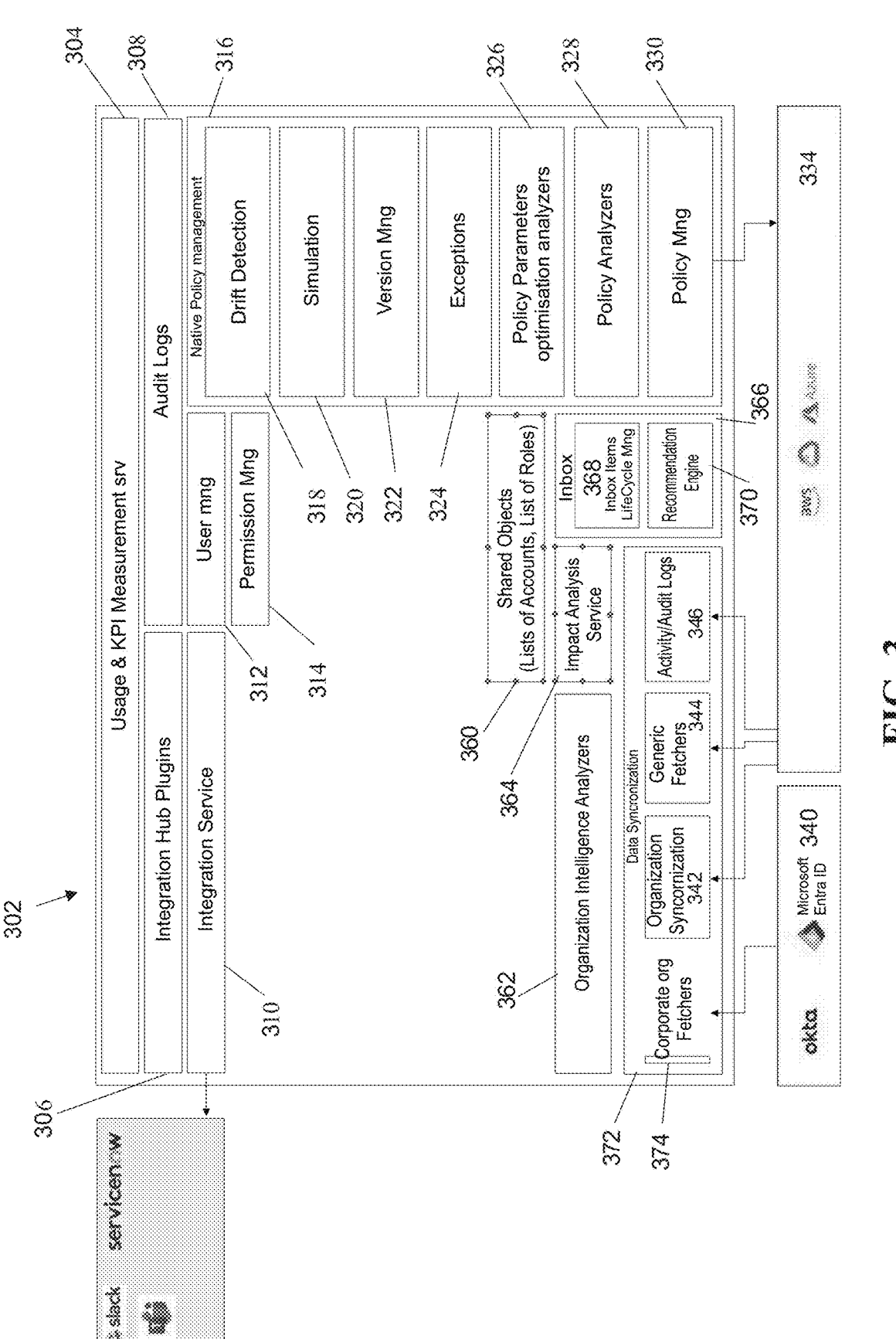
FIG. 3 is a block diagram of exemplary components of a computing environment for automatic provisioning of cloud-specific services and/or resources running on one or more computing clouds, in accordance with some embodiments of the present invention.
Figure 4:
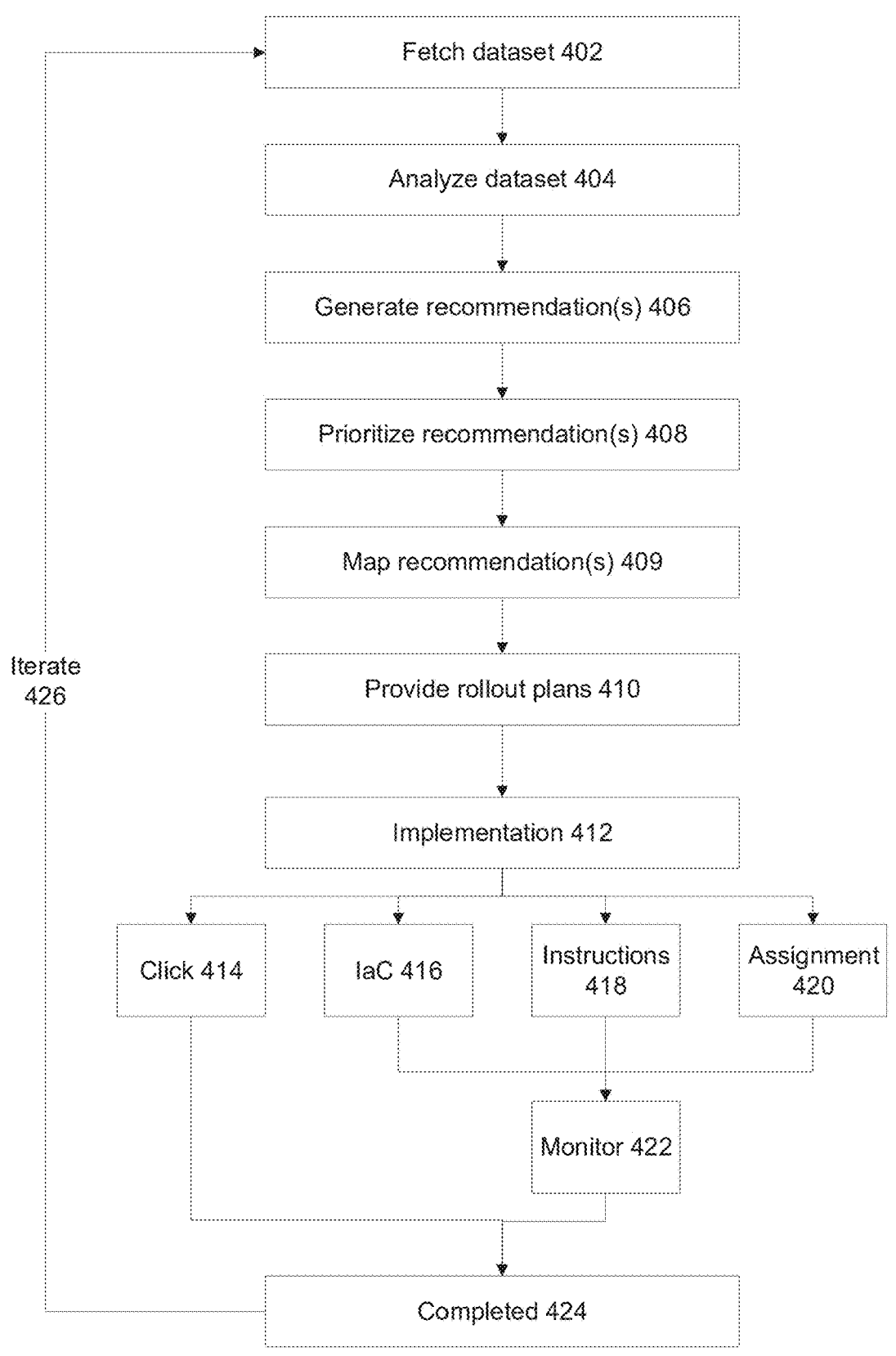
FIG. 4 is a flowchart of an exemplary method for automatic provisioning of cloud-specific services and/or resources running on one or more computing clouds for account segmentation, for creating a cloud native application protection platform (CNAPP)-like architectural setup using native tools, and/or for implementing a region management policy, in accordance with some embodiments of the present invention.
Figure 5:
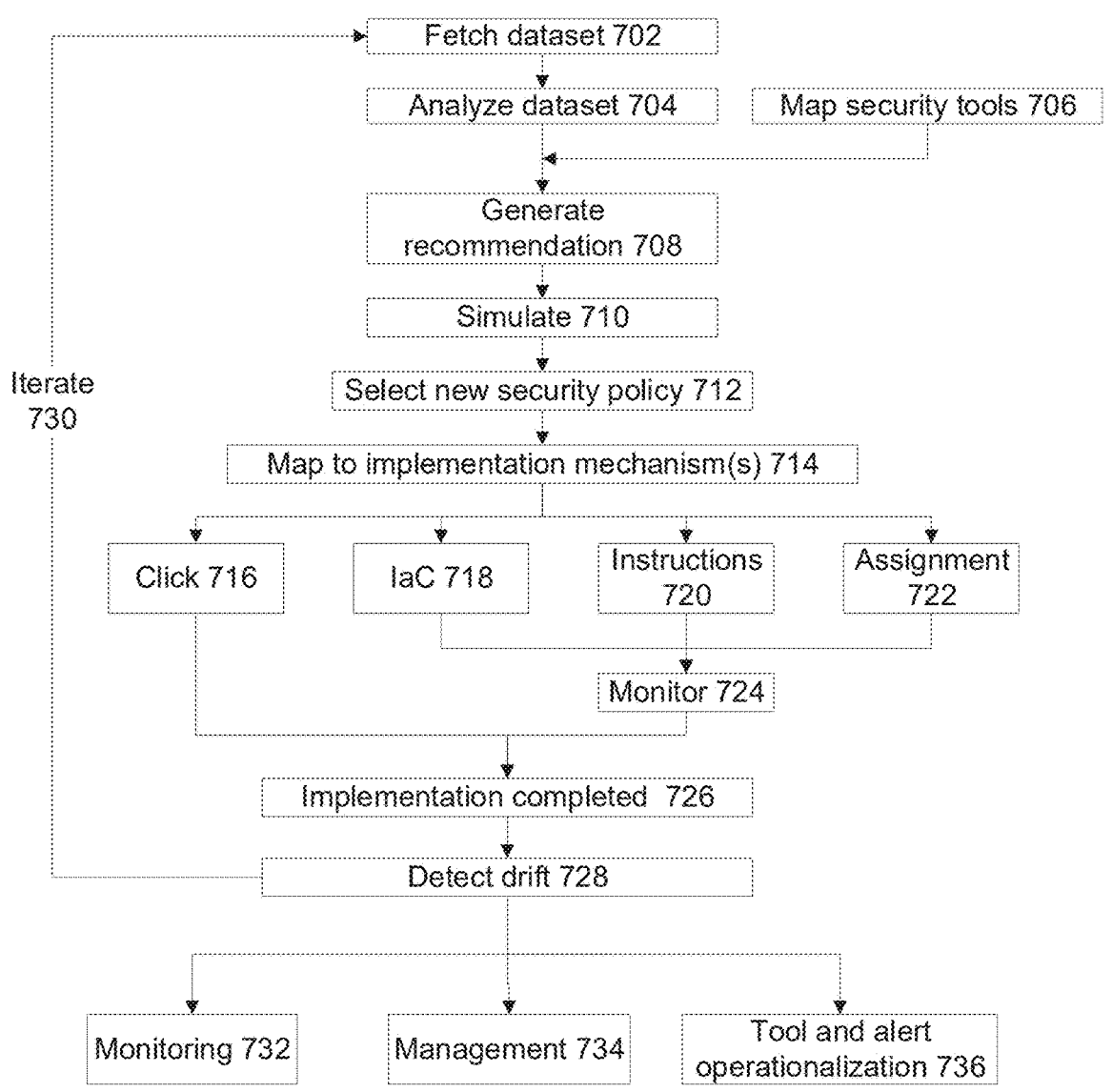
FIG. 5 is a flowchart of an exemplary method for automatic provisioning of cloud-specific security tools running on one or more computing clouds, in accordance with some embodiments of the present invention.
Figure 6:
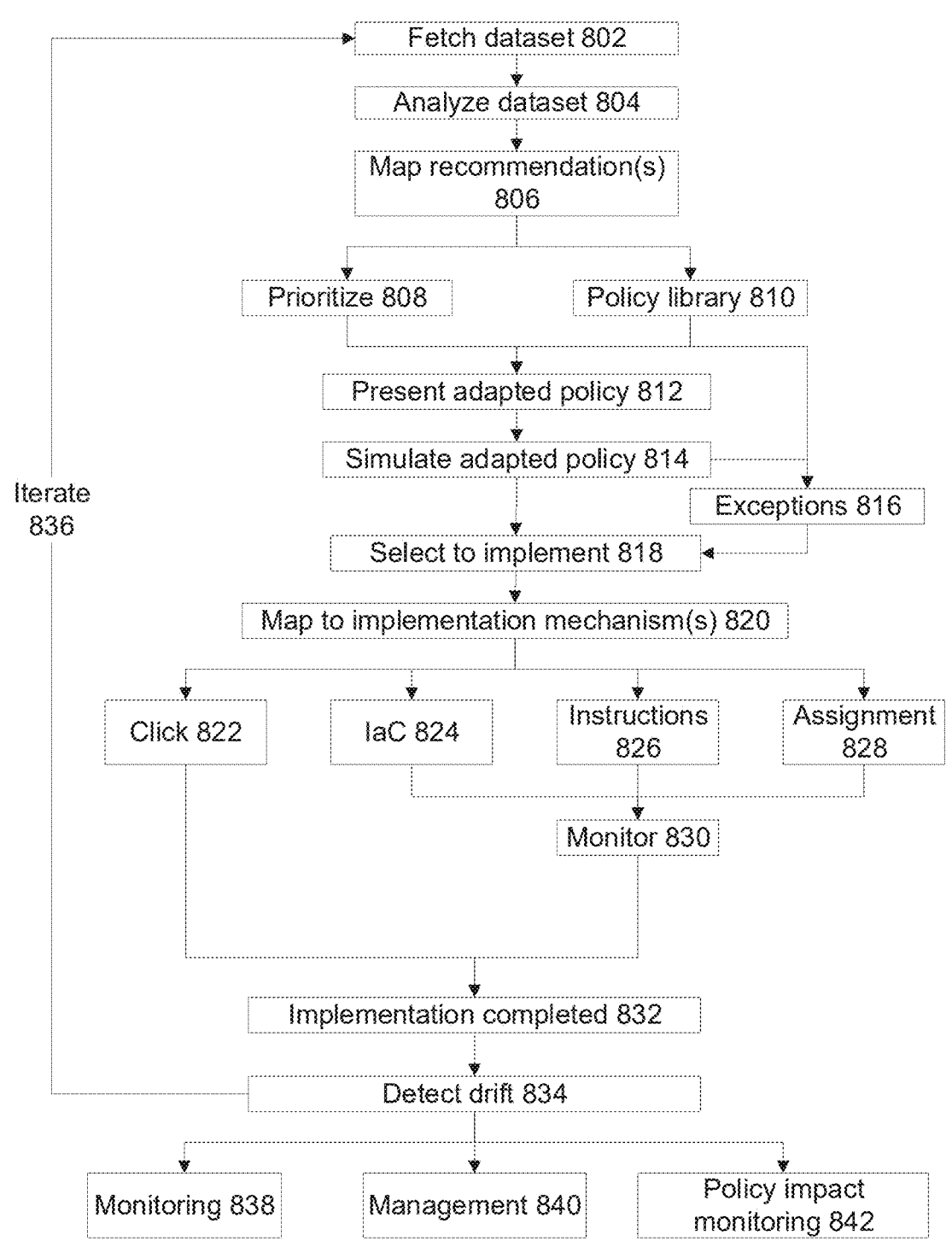
FIG. 6 is a flowchart of an exemplary method for automatic adaptation of a policy (e.g., policy management) for provisioning of cloud-specific services and/or resources running on one or more computing clouds, in accordance with some embodiments of the present invention.

Reference is now made to FIG. 1, which is a block diagram of components of a system 100 for automatic provisioning of multiple services on multiple computing clouds, in accordance with some embodiments of the present invention. Reference is also made to FIG. 2, which is a flowchart of a method of automatic provisioning of multiple services on multiple computing clouds, in accordance with some embodiments of the present invention. Reference is also made to FIG. 3, which is a block diagram of exemplary components of a computing environment for automatic provisioning of cloud-specific services and/or resources running on one or more computing clouds, in accordance with some embodiments of the present invention. Reference is also made to FIG. 4, which is a flowchart of an exemplary method for automatic provisioning of cloud-specific services and/or resources running on one or more computing clouds for account segmentation, for creating a cloud native application protection platform (CNAPP)-like architectural setup using native tools, and/or for implementing a region management policy, in accordance with some embodiments of the present invention. Reference is also made to FIG. 5, which is a flowchart of an exemplary method for automatic provisioning of cloud-specific security tools running on one or more computing clouds, in accordance with some embodiments of the present invention. Reference is also made to FIG. 6, which is a flowchart of an exemplary method for automatic adaptation of a policy (e.g., policy management) for provisioning of cloud-specific services and/or resources running on one or more computing clouds, in accordance with some embodiments of the present invention.

Referring now back to FIG. 1, system 100 may implement the acts of the method described with reference to FIGs. described herein, by processor(s) 102 of a computing environment 104 executing code instructions stored in a memory 106 (also referred to as a program store).

In an exemplary embodiment, computing environment 104 is implemented as a computing cloud, providing software as a service (SaaS), for example, to client terminals 108.

Alternatively, computing environment 104 may be implemented on-premises, for example, running within a server.

Computing environment 104 may be implemented as, for example one or more and/or combination of: a group of connected devices, a client terminal, a server, a virtual server, a virtual machine, a desktop computer, a thin client, a network node, and/or a mobile device (e.g., a Smartphone, a Tablet computer, a laptop computer, a wearable computer, glasses computer, and a watch computer).

Computing environment 104 provides automated provisioning services to one or more computing clouds 108, as described herein.

Computing cloud(s) 118 may be provided by one or more operators, where each different computing cloud is run by a different operator. Each computing cloud 118 may run its own respective cloud specific services and/or resources 152. Code sensor(s) 150 may be installed on computing cloud(s) 118 for collecting data and providing the data to computing environment 104, as described herein. Alternatively or additionally, data fetchers may be installed on computing environment(s) 104 for fetching data from computing cloud(s) 118.

Computing environment 104 executing stored code instructions 106A, may be implemented as one or more servers (e.g., network server, web server, a computing cloud, a virtual server) that provides centralized services to one or more client terminals 108, for centrally automatically provisioning computing cloud(s) 118, as described herein. One or more client terminal(s) 108 may access computing environment 104 to define and/or review the proposed automated provisioning over network 110. Services for managing the automated provisioning may be provided by computing environment 104 to client terminals, for example, as software as a service (SaaS), a software interface (e.g., application programming interface (API), software development kit (SDK)), an application for local download to the client terminal(s) 108, an add-on to a web browser running on client terminal(s) 108, and/or providing functions using a remote access session to the client terminals 108, such as through a web browser executed by client terminal 108 accessing a web sited hosted by computing environment 104. For example, each client terminal(s) 108 may access a graphical user interface (GUI) hosted by computing environment 104, to view proposed automated provisioning and/or manage the automated provisioning. Respective computing clouds 118 associated with a session of each respective client terminal 108 may be automatically provisioned using computing environment 104, as described herein.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices. Processor(s) 102 may be running within the computing cloud implementation of computing environment 104.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGs. provided herein when executed by hardware processor(s) 102. Memory 106 may be implemented within the computing cloud implementation of computing environment 104.

Computing environment 104 may include a data storage device 122 for storing data, for example, repository of generated technical architectures 122A, repository of computed architectural adaptations 122B and/or repository of generated code-scripts 122C, as described herein. It is noted that the architectures and/or templates and/or code-scripts may be customized in real-time or near real-time, for example, based on interactions of users with the computing cloud and/or dataset(s) collected from the computing cloud, as described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may be designed to enable input of data and/or viewing of data. Exemplary user interfaces 126 include, for example, one or more of, a touchscreen, a display, gesture activation devices, a keyboard, a mouse, and voice activated software using speakers and microphone.

Referring now back to FIG. 2, at 202, multiple datasets are collected from multiple computing clouds which are associated with a common entity.

The multiple datasets may be collected by code sensors monitoring cloud-specific services and/or resources running in the computing clouds of the common entity. The code sensors may be installed within respective computing clouds. Alternatively or additionally, the multiple datasets may be obtained by data fetchers that fetch data from the cloud-specific services and/or resources running in the computing clouds of the common entity. The data fetchers may be installed externally to the computing clouds, for example, within a central server that fetchers the datasets for central analysis and/or generation of code-scripts, as described herein.

Cloud-specific services and/or resources may include cloud-specific security services and/or security resources, for example, identity and access management (IAM), firewall, threat detection, and policy management (e.g., security policy management).

Other examples of cloud-specific services and/or resources include virtual machines, virtual servers, storage, databases, networking, artificial intelligence (AI)/machine learning (ML), developer tools, monitoring, management, security, identity, and the like.

The common entity may be, for example, a single user, a group (e.g., organization) of multiple users, and the like. The common entity may use different accounts set up on the multiple computing clouds, for example, for providing services and/or resources to a central server of the group (e.g., organization).

The cloud environment of the common entity may be built, for example, by one or more providers, one or more groups (e.g., organizations) and/or tenants in cloud environment, one or more accounts and/or subscriptions and/or projects and/or compartments in each (where terminology differs by the cloud provider).

The datasets may include one or more of the following data: which entities (e.g., individual users, bots, executing processes) are using each respective computing cloud, what each entity is doing in each computing cloud (e.g., storing data, using applications, accessing stored data), and/or when each entity used each respective computing cloud (e.g., time pattern of use), what code is running in each respective computing cloud, what third parties are accessing in each respective computing cloud, what applications are running in each respective computing cloud, at least one policy, security service configurations, cloud usage patterns, billings (e.g., configurations and/or amount), resource configurations, and applications (e.g., business applications) of the common entity such as which applications the common entity has, and/or where the applications are run. Billing may be correlated with usage, and used for example, to identify usage patterns and/or identify cost optimized technical architectures.

Optionally, the code sensors and/or data fetchers are granted control-plane access and denied data-plane access, such that the code sensors and/or data fetchers are excluded from accessing data stored within the cloud-specific services and/or resources. For built-in security architecture (e.g., policy) installation buttons or security service enablement, optional write permissions may be needed for relevant APIs.

Exemplary implementations of code sensors include: installing a stack on a management account which installs a dataset that includes permissions for rolling out to selected member account, adding an application to the respective computing cloud and running a script to grant permission to the application to collect a dataset, and granting permission to a service account to access the respective computing cloud.

The datasets may be obtained, for example, by using a queue-based approach to query cloud service provider (CSP) application programming interfaces (APIs) for each account and/or region and/or service and/or resource. Each queue entry may act as an independent work process that can be processed in parallel. The aforementioned process may be designed for handling large environments efficiently and/or managing API rate limits effectively. The aforementioned process for obtaining the datasets may be automatically executed by data fetchers.

Onboarding mechanisms may be supported for different computing clouds. This allows users to install the computing environment described herein across their entire cloud organization in a single process without needing account-by-account installation. Other cloud providers may be supported with similar onboarding mechanisms. Additional exemplary details on the onboarding process within different types of cloud environments include:

A role is provided to be installed in a management account of the computing cloud and across accounts in the organization. This may be done through a CloudFormation stack which is installed on the management account, which in turn installs a StackSet that contains the permissions that are rolled out to all relevant member accounts in the chosen organizational unit. For example, as implemented by Amazon Web Services (AWS).

Installation may be done by adding an application to the respective computing cloud, and then running a Cloud Shell script to grant it permissions to collect information on behalf of subscriptions to the respective computing cloud. For example, as implemented by Azure.

Installation may be done by granting permissions to a service account to access the respective computing cloud. Permission assignment may be done through Terraform or by running a GCloud Script. Separate service accounts for each customer may be used, ensuring the highest security standards. For example, as implemented by Google Cloud Platform (GCP).

At 204, the datasets are analyzed.

Optionally, the datasets are analyzed by performing multi-layer analysis. A mapping of an environment's (e.g., computing cloud's) policies, service usage, applications, accounts, billing data, and dependencies, may be generated based on the multi-layer analysis. Outcomes of the multi-layer analysis may be aggregated. The technical architecture may be generated according to the aggregated outcomes. For example, when evaluating region management security policies in a certain cloud environment, one analyzer assesses organizational security policies (for example, declarative policies, cloud-specific policies, custom organization policies, service control policies (SCPs), resource control policies (RCP), declarative policies, etc. . . . ), another analyzer analyzes cost data and resource usage per region, a third examines coverage at the organizational level, yet another analyzes whether the security policy is covering an organization properly; whether the security policy is technically and correctly written, and if some regions can be optimized and blocked as well, and/or other analyzers for performing other analysis described herein may be used. Once analyzed, the results may be aggregated, which enables a user interface (e.g., graphical user interface) to render refined insights rather than raw data. To handle large datasets (e.g., thousands of nodes in an organizational tree), server-side data loading and/or filtering processes may be implemented. This may help ensure that end-users benefit from responsive, intuitive visualizations even as their cloud footprint grows. Alternatively or additionally, the datasets are analyzed by mapping the cloud-specific services and/or resources to categories associated with objectives. The technical architecture may be generated according to the mapped categories.

Alternatively or additionally, the datasets are analyzed by a set-of-rules.

Alternatively or additionally, the datasets are analyzed by feeding into one or more machine learning (ML) models and/or artificial intelligence (AI) models. For example, individual ML models, ensemble of one or more ML models, pipelines of ML models, and the like. Exemplary architectures include, for example, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

At 206, a technical architecture is automatically generated according to the analysis. The technical architecture is for being implemented across cloud-specific services and/or resources.

The technical architecture may be defined as a common policy and/or objective to achieve across the cloud-specific services and/or resources of the computing clouds. The architectural adaptations may be for normalizing the current architectures to generate the technical architecture for meeting the common policy and/or objective. Each respective architectural adaptation is for adapting a corresponding cloud-specific service and/or resource for meeting the common policy and/or objective.

Examples of policies for which technical architectures may be automatically generated are described, for example, with reference to FIGS. 4-6.

At 208, multiple architectural adaptations to the cloud-specific services and/or resources are computed. The architectural adaptations are computed for adapting current architectures to generate the technical architecture in each of the cloud-specific services and/or resources of the computing clouds.

In response to the technical architecture including a common policy and/or objective to achieve across the cloud-specific services and/or resources running on the computing clouds, the multiple architectural adaptations are for normalizing current architectures to generate the technical architecture in each of the cloud-specific services and/or resources running on the computing clouds.

Users (e.g., of the common entity) may provide one or more objectives (e.g., security objectives) and/or one or more policies (e.g., security policies) in natural language, which is translated to a technical architecture for implementing the security objective across the security services and/or security resources, as described herein.

The architectural adaptations may be are at a DevOp level. The phrase "DevOp level" may refer to operations and/or processes tailored for deploying, managing, and/or scaling applications and/or infrastructure in the cloud while following DevOps principles. The architectural adaptations at the DevOp level may relate to integration of cloud-native tools and/or services to enhance automation and/or collaboration. For example:

Cloud-Native CI/CD Pipelines: Setting up automated build, test, and deployment workflows using cloud services.

Infrastructure as Code (IaC): Managing cloud resources with tools.

Monitoring and Logging: Using cloud-native monitoring tools for real-time insights into system performance.

Scalability and Availability: Leveraging cloud capabilities like auto-scaling, load balancing, and redundancy to ensure reliable service delivery.

Security Practices: Implementing role-based access control (RBAC), secrets management, and compliance monitoring in cloud-based DevOps workflows.

Examples of the technical architecture and corresponding architectural adaptations include:

The technical architecture defines a security objective, and the architectural adaptations are for one or more of: segmenting environments, creating preventive security policies configuring a firewall, provisioning a sandbox environment with limited access for testing, connections and/or dataflows between the plurality of cloud-specific services and/or resources, setting up autonomous response workflows for breaches, ensuring security tools are set up in conjunction with the types of cloud workflows set, setting up perimeter access for third-parties, and provisioning accounts and identities on behalf of customers.

The technical architecture defines a network objective, and the architectural adaptations are for one or more of configuring a virtual private network, and configuring a load balancer.

The architectural adaptations include allocation of at least one cloud-specific service and/or resource.

At 210, multiple codes, optionally code-scripts, are generated according to the architectural adaptations. The code-scripts are generated for installation at corresponding cloud-specific services and/or resources running on each corresponding computing cloud. The code-scripts, when installed, are for implementing the technical architecture across the computing clouds of the common entity.

Optionally, one or more code-script are generated as an infrastructure-as-code (IaC) template complying with at least one IaC format, for example, CloudFormation, Terraform, and Pulumi.

Alternatively or additionally, one or more code-scripts are generate for installation via a pipeline.

Alternatively or additionally, step-by-step instructions for manual installation of the code-scripts are generated. The instructions may be, for example, written for security and/or DevOps specialists to implement. The instructions may be generated, for example, by a large language model (LLM) that is fed the code-scripts and/or other metadata such as of the associated cloud-specific service and/or resource.

Optionally, the code-scripts are designed to require read permissions and not require write permissions.

At 212, each code-script is installed within the corresponding cloud-specific service and/or resource running on each corresponding computing cloud.

Optionally, one or more code-scripts are automatically installed, for example, generated as as an IaC dataset and creating a push request for the IaC (e.g., on behalf of the user), using an API invocation, via a pipeline, and the like.

Alternatively, one or more code-scripts are manually installed, optionally according to the generated step-by-step instructions.

Alternatively or additionally, one or more code-scripts are installed via an integration with a software development kit (SDK) of a provider of a computing cloud running the respective cloud specific security service and/or security resource and calling a API for installing the code-script(s) (e.g., when write permission is granted).

Optionally, the code-scripts are generated and/or installed in response to a single click by a user via a user interface, optionally via a graphical user interface (GUI).

Alternatively or additionally, the code-scripts are generated and/or installed in response to detection of a change to the cloud environment of the common entity.

Optionally, impact of installing the code-scripts is simulated. The simulation may be performed, for example, to ensure that the code-scrips may be safely rolled out without impacting or significantly impacting applications running on the common entity's cloud environment, such as without impacting or significantly impacting performance, data integrity, and security. One or more metrics may be computed according to the simulation. The code-scripts may be automatically installed in response to the metric(s) meeting at least one target requirement. The simulation may be performed, for example, by generating a model of the computing cloud based on historical datasets, and adapting the actual technical architecture (e.g., policy) that was used during collection of the historical datasets to the adapted technical architecture. In another example, the simulation may be performed, for example, by setting up a container and/or other controlled virtual environment as a copy or similar to the actual environment in which the code-scripts are to be implemented, running the virtual environment using the code-scripts, and monitor the actual impact within the controlled virtual environment.

At 214, one or more features described with reference to 202-212 may be iterated. The iterations may be performed, for example, in real-time or near real-time, at predefined intervals (e.g., once a day, once a week), in response to events (e.g., installation of a new application, change of a security policy by a user, available of a new version), and/or manually triggered.

Optionally, iterations are performed in response to monitoring performed post installation of the code-scripts.

Optionally, in response to the installation of the code-scripts for implementing the technical architecture, the datasets collected during the monitoring may be analyzed for detecting drift from the generated technical architecture, such as a change in compliance with the generated technical architecture. Drift may occur, for example, due to unauthorized changes to the technical architecture and/or policy. Architectural adaptations may be automatically re-computed for resolving the drift in response to the detected drift, such as in an attempt to achieve compliance. The monitoring and/or analyzing may be performed in near real-time or real-time, for near real-time or real-time detection of drift (e.g., on the order of minutes from occurrence such as less than about 1, or 5, or 10 minutes).

Referring now back to FIG. 3, exemplary processes and/or data implemented by computing environment 302 are now described. Computing environment 302 may correspond to computing environment 104 described with reference to FIG. 1, and/or which may be implemented by and/or used for implementing one or more features described with reference to FIG. 2 are now described. The exemplary processes and/or data described with reference to FIG. 3 may be implemented, for example, as code instructions stored on a data storage device and executed by one or more processors, for example, code 106A described with reference to FIG. 1.

A Usage and KPI measurement service process 304 may include code for automatically analyzing datasets described herein, to identify usage and/or perform KPI measurements.

An Integration Hub Plugins 306 may include code for providing plugins to an integration service code 310.

Audit Logs 308 may be set for storing audit logs of the computing environment.

An Integration Service 310 may include code for integration with external services 332.

A user management process 312 may include code designed to manage users.

A permission management process 314 may include code designed to manage permissions of the computing environment.

A Native Policy Management process 316 may include code for managing a native policy, such as for managing the technical architecture. For example, one or more of: a Drift Detection process 318 for detection of drift after installing the code-scripts (additional details of drift detection are described herein), a Simulation process 320 for simulating impact of installation of the code-scripts prior to installation, a Version Management process 322 for managing different versions, an Exceptions process 324 for managing exceptions, a Policy Parameters Optimization Analyzers process 326 for managing parameters related to the policy (e.g., the technical architecture), a Policy Analyzer process 328 for analyzing the policy (e.g., the technical architecture), and a Policy Management process 330 for managing the policy (e.g., the technical architecture).

Native Policy Management process 316 is in communication with multiple cloud-specific services and/or resources 334 hosted by one or more computing clouds.

A Shared Objects dataset 360 may be set for storing data, for example, lists of accounts, lists of roles, and the like.

An Organization Intelligence Analyzers process 362 may analyze organizational data.

An Impact Analysis Service process 364 may analyze impact of the code-scripts.

An inbox process 366 may include the following processes: an Inbox Items LifeCycle management process 368 for managing inbox items, and a Recommendation Engine 370 that generates recommendation for example for the technical architecture.

Recommendation engine 370 may generate actionable insights to help users with use cases, for example:

Ensure uniformity and/or correctness of native service deployment across environments.

Tailor service coverage to align with existing cloud usage.

Easily view and/or optimize native service spending, including trends and/or cost predictions for new capabilities.

Identify duplicate service coverage, such as instances where both a native and third-party equivalent capability are installed. Including an analysis of whether there is a differentiating value for each capability.

A data synchronization process 372 may include processes for synchronization of data, for example, Data Fetchers 374 that fetch data from external data sources 340, an Organizational Synchronization process 342 that synchronizes data across the organization, Generic Fetches 344 that fetch data from cloud-specific services and/or resources 334, and an Activity/Audit Logs 346 that is set for storing activity/audit logs. Processes 342 and/or 346 communicate with cloud-specific services and/or resources 334.

Referring now back to FIG. 4, the exemplary method is now described for the common policy and/or objective (according to which the technical architecture is generated) of account segmentation: to identify different sub-environments within the computing cloud infrastructure of the entity, and ensure they are unable to communicate with one another. For example, ensure non-production is not connected to production. Code scripts are generated for implementing the common policy and/or objective of account segmentation, as described herein.

Account segmentation may refer to analyzing and/or identifying sub-environments (for example, as production and non-production) and/or putting guardrails such that access patterns between the sub-environments are blocked. Account segmentation may include division of cloud resources across multiple accounts, for example, to enhance security, compliance, cost management, and/or operational efficiency. For example, Different accounts for different teams, projects, or environments (e.g., dev, test, prod) reduce risk by security isolation. In another example, segmentation provides access control, by enforcing least privilege by limiting permissions to specific accounts.

The exemplary method described with reference to FIG. 4 includes, corresponds to, and/or may be implemented by, components of the system described with reference to FIG.

1 and/or the computing environment described with reference to FIG. 3, and/or one or more features described with reference to FIG. 2. The exemplary method described with reference to FIG. 4 is not meant to be necessarily limiting, and may be adapted by one skilled in the art accordingly, for example, according to the flow described with reference to FIG. 2, and/or by removing features, adding features, and/or adapting features.

At 402, fetchers collect information from the computing clouds of the common entity, for example, on the workloads and/or resources within each cloud account of the entity.

Additional exemplary details are described, for example, with reference to 202 of FIG. 2.

At 404, analyzers automatically categorize individual cloud accounts based on their usage. Multiple categorizations are generated, for example, production versus non-production. Additional exemplary details are described, for example, with reference to 204 of FIG. 2.

At 406, based on the categorizations created, and on existing security settings, users may receive recommendations on how to segment the environment of the entity. Examples of recommendations include: Implement policy to ensure production and non-production cannot communicate with each other; Allow cross cloud provider communication only between accounts that belong to the same team; Indicating to the user that they attempted to implement a policy that segments production and non-production, but no production accounts which are not included in the policy have been identified. Additional exemplary details are described, for example, with reference to 206 of FIG. 2.

At 408, relevant recommendations are prioritized against other policies and surfaced both within the policy management interface and within the inbox.

At 409, the (prioritized) recommendations may be mapped to technical policies across providers and/or one or more candidate implementation mechanisms may be provided. Additional exemplary details are described, for example, with reference to 208-210 of FIG. 2.

At 410, each recommendation may be accompanied with relevant rollout plans, optionally together with the tools to visualize their impact to assess the policy is functioning as expected and to decide to move to the next implementation phase. For example, start by implementing this in test accounts within each environment and gradually grow. Limit communication from production to non-production and then move to the other direction. Additional exemplary details are described, for example, with reference to 208-210 of FIG. 2.

At 412, after selecting an objective and/or rollout plan, proceed to implement.

At 414, Option 1: Implementation may be in response to a click of a button, optionally a single click, optionally by calling APIs on behalf of the entity.

At 416, Option 2: Implementation with IaC. IaC templates may be generated for the entities for them to add to their code pipelines.

At 418, Option 3: Automatically generated step-by-step instructions.

At 420, Option 4: Assignment to team members, such as for manual implementation. Team members may be able to access their own version of the computing environment described herein, for example, to benefit from the prior implementation options.

Additional exemplary details for 412-420 are described, for example, with reference to 210-212 of FIG. 2.

At 422, monitoring may be performed to ensure implementation is complete. Additional exemplary details are described, for example, with reference to 214 of FIG. 2.

At 424, an indication that the policy implementation has been completed may be generated. Entities may access the policy through a library to view the current implementation, or receive additional recommendations via the inbox. Additional exemplary details are described, for example, with reference to 214 of FIG. 2.

At 426, one or more features described with reference to 402-424 may be iterated. Iterations may be performed, for example, in response to changes to the user (e.g., customer) environment, detected drift, and the like. Additional exemplary details are described, for example, with reference to 214 of FIG. 2.

Optionally, a feature which may be referred to as "custom policies" or "bring your own policies" is implemented, for example, with respect to features described with reference to 402-406. Customized security policies of the common entity are obtained, for example, by connecting to the environment of the common entity. The customized security policies may include, for example preventive policies and/or other types of policies as described herein. A first set of the customized security policies is mapped to at least one predefined template, for example, included in a library managed by the computing environment. The first set may be presented accordingly. For a second set of the customized security policies which are not mapped (e.g., no similar libraries exist), the second set may be analyzed using ML models and/or AI models. The model(s) may extract names and/or descriptions in natural language, which may be matched to similar security policies, for example, across the common entity's computing clouds. The technical architecture may be generated for the first set according to the predefined template(s) and for the second set according to the matching similar customized security policies. The same management tools as the managed policies described herein may be offered, for example, drift, exceptions, deploying to the rest of the cloud environment and the like. It is noted that the aforementioned feature may be adapted for other use cases described herein, for example, described with reference to FIG. 2, or 4-6.

It is noted that features described with reference to FIGS. 4-6 may be interchanged, added, adapted, or removed, accordingly. For example, the features of detecting drift described with reference to 728 of FIG. 5, monitoring described with reference to 732 of FIG. 5, management described with reference to 734 of FIG. 5, and/or operationalization described with reference to 736 of FIG. 5, may be implemented after feature 426 of FIG. 4. For example, if there are any alerts (such as in the case of CNAPP, not necessarily applicable to policies), the computing environment may assist with response runbacks; for example, changing firewall rules based on alerts, isolating instances, etc. . . .

Referring now back to FIG. 4, the exemplary method is now described for the common policy and/or objective (according to which the technical architecture is generated) of creating a CNAPP-like architectural setup using native tools. For clarity and completeness, all the features of FIG. 4 are described.

At 402, fetchers collect information from the computing clouds of the common entity, for example, on the workloads and/or resources within each cloud account of the entity, on third-party security vendors, and/or on security tool cost. Additional exemplary details are described, for example, with reference to 202 of FIG. 2.

At 404, analyzers understand which CNAPP components are required for use based on existing cloud usage and/or existing tool settings. Examples of CNAPP components include: AWS—Inspector, Security Hub, Config, Macie, IAM Access Analyzer, Detective, EventBridge; GCP—Security Command Center, Cloud DLP; Azure—Defender for Cloud, Event Hub. It is to be understood that the aforementioned CNAPP components are examples, as some CNAPP components may be used in some cases but not in other cases, such as depending on cloud usage patterns. There may be other CNAPP component of the aforementioned providers and/or other providers which are not necessarily mentioned. Additional exemplary details are described, for example, with reference to 204 of FIG. 2.

At 406, based on the mapping created, and on existing security settings, users may receive recommendations on how to install CNAPP in their computing cloud environments. Examples of recommendations include: CNAPP installed in some, but not all, cloud environments; Better CNAPP setup is available allowing optimization of costs, CNAPP not correctly installed, providing partial/lacking coverage; CNAPP tools not fully operationalized—for example, alerts not routed to proper owners in ticketing system. Additional exemplary details are described, for example, with reference to 206 of FIG. 2.

At 408, relevant recommendations are prioritized against other policies and surfaced both within the policy management interface and within the inbox.

At 409, the (prioritized) recommendations may be mapped to technical policies across providers and/or one or more candidate implementation mechanisms may be provided. Additional exemplary details are described, for example, with reference to 208-210 of FIG. 2.

At 410, each recommendation may be accompanied with cost estimation and/or a summarized cost-value analysis, which may allow users to decide whether to proceed with installation. Examples of recommendations include: Start by implementing this in test accounts within each environment and gradually grow. Limit communication from production to non-production and then move to the other direction. Additional exemplary details are described, for example, with reference to 208-210 of FIG. 2.

At 412, after selecting an objective and/or rollout plan, proceed to implement.

At 414, Option 1: Implementation may be in response to a click of a button, optionally a single click, optionally by calling APIs on behalf of the entity.

At 416, Option 2: Implementation with IaC. IaC templates may be generated for the entities for them to add to their code pipelines.

At 418, Option 3: Automatically generated step-by-step instructions.

At 420, Option 4: Assignment to team members, such as for manual implementation. Team members may be able to access their own version of the computing environment described herein, for example, to benefit from the prior implementation options.

Additional exemplary details for 412-420 are described, for example, with reference to 210-212 of FIG. 2.

At 422, monitoring may be performed to ensure implementation is complete. Additional exemplary details are described, for example, with reference to 214 of FIG. 2.

At 424, an indication that the policy implementation has been completed may be generated. Entities may access the policy through a library to view the current implementation, and/or receive continued cost management insights and/or additional recommendations. Additional exemplary details are described, for example, with reference to 214 of FIG. 2.

At 426, one or more features described with reference to 402-424 may be iterated. Additional exemplary details are described, for example, with reference to 214 of FIG. 2.

Referring now back to FIG. 4, the exemplary method is now described for the common policy and/or objective (according to which the technical architecture is generated) of implementing a region management policy, restricting use of approved cloud regions, such as only allowing use of the approved cloud regions. For clarity and completeness, all the features of FIG. 4 are described.

At 402, fetchers collect information on each cloud region. Additional exemplary details are described, for example, with reference to 202 of FIG. 2.

At 404, analyzers assess which regions are in use and if there are policies to block the ones that are unused. Additional exemplary details are described, for example, with reference to 204 of FIG. 2.

At 406, recommendations are generated based on existing policies the entity has. For example, the recommendation is for the relevant parameters to the policy, such as which regions need to be denied, which services it should cover, which roles it should exempt. Examples of recommendations for the region management policy include: Missing policy—including the recommended regions for it to be installed on; Partial policy—not installed on all organization accounts where it should be; Region optimization—existing regions which allows unnecessary regions; Incorrect policy—the customer has a policy which blocks regions in some, but not all, cases. Additional exemplary details are described, for example, with reference to 206 of FIG. 2.

At 408, relevant recommendations are prioritized against other policies and surfaced both within the policy management interface and within the inbox.

At 409, after selecting to implement a recommendation, the recommendation is mapped to technical policies across providers. One or more candidate implementation mechanisms may be provided. Additional exemplary details are described, for example, with reference to 208-210 of FIG. 2.

At 410, each recommendation may be accompanied with cost estimation and/or a summarized cost-value analysis, which may allow users to decide whether to proceed with installation. Examples of recommendations include: Start by implementing this in test accounts within each environment and gradually grow. Limit communication from production to non-production and then move to the other direction. Additional exemplary details are described, for example, with reference to 208-210 of FIG. 2.

At 412, proceed to implement.

At 414, Option 1: Implementation may be in response to a click of a button, optionally a single click, optionally by calling APIs on behalf of the entity. Alternatively, implementation is completely autonomous.

At 416, Option 2: Implementation with IaC. IaC templates may be generated for the entities for them to add to their code pipelines. The IaC template may be automatically inserted into the code pipeline(s) of the common entity.

At 418, Option 3: Automatically generated step-by-step instructions.

At 420, Option 4: Assignment to team members, such as for manual implementation. Team members may be able to access their own version of the computing environment described herein, for example, to benefit from the prior implementation options.

Additional exemplary details for 412-420 are described, for example, with reference to 210-212 of FIG. 2.

At 422, monitoring may be performed to ensure implementation is complete. Additional exemplary details are described, for example, with reference to 214 of FIG. 2.

At 424, an indication that the policy implementation has been completed may be generated. Entities may access the policy through a library to view the current implementation, and/or receive additional recommendations via the inbox. Additional exemplary details are described, for example, with reference to 214 of FIG. 2.

At 426, one or more features described with reference to 402-424 may be iterated. Additional exemplary details are described, for example, with reference to 214 of FIG. 2.

Referring now back to FIG. 5, the exemplary method for automatic provisioning of cloud-specific security tools running on one or more computing clouds, is depicted.

The exemplary method described with reference to FIG. 5 includes, corresponds to, and/or may be implemented by, components of the system described with reference to FIG. 1 and/or the computing environment described with reference to FIG. 3, and/or one or more features described with reference to FIG. 2. The exemplary method described with reference to FIG. 5 is not meant to be necessarily limiting, and may be adapted by one skilled in the art accordingly, for example, according to the flow described with reference to FIG. 2, and/or by removing features, adding features, and/or adapting features.

At 702, fetchers collect information from each computing cloud associated with the entity. The collected information may be associated with cloud-specific security tools running on respective clouds which may be used by the entity. Additional exemplary details are described, for example, with reference to 202 of FIG. 2.

At 704, analyzers triage the collected information. Recommendations may be generated according to the collected information. The recommendations may include one or more action items for existing and/or new cloud-specific security tools. Additional exemplary details are described, for example, with reference to 204 of FIG. 2.

At 706, cloud-specific security tools from different computing cloud providers may be mapped to categories. The categories may relate to objectives, in contrast to being related to technical building blocks. Additional exemplary details are described, for example, with reference to 206 of FIG. 2

At 708, when viewing a certain cloud-specific security service, and/or a recommendation for the certain cloud-specific security service, a current status of the certain cloud-specific security tool may be presented, optionally graphically, within a user interface, optionally a graphical user interface (GUI). The current status may be presented graphically on an organization chart and/or using information collected by the fetches and/or analyzers. Examples of status of the certain cloud-specific security service include: Is the certain cloud-specific security tool installed? Is the certain cloud-specific security tool installed correctly? Can cost of operating the certain cloud-specific security tool be optimized? Is the certain cloud-specific security tool needed? Through the GUI, optionally a management page presented in the GUI, users associated with the entity may customized their security policies, for adapting an existing security policy for defining a new security policy.

At 710, a simulation may be performed according to the new security policy (e.g., settings). The simulation may include, for example, a simulation of potential cost. A cost-value analysis may be performed for the entity. Additional exemplary details are described, for example, with reference to 212 of FIG. 2

At 712, the entity may select to implement the new security policy, optionally according to the recommendation and/or adaption of the existing security policy (e.g., settings). The selection to implement the new security policy may occur after the user(s) associated with the entity review the changes to the existing security policy. Additional exemplary details are described, for example, with reference to 208-210 of FIG. 2.

At 714, the desired security settings may be mapped to implementation mechanisms, for implementation across one or more different computing clouds. The desired security settings may be prepared for implementation. Different implementation options may be provided, for example, presented on a display (e.g., within the GUI) for selection by the user and/or through an API (e.g., provided by the computing environment). Additional exemplary details are described, for example, with reference to 208-210 of FIG. 2.

At 716, Option 1: Implementation may be in response to a click of a button, optionally a single click. Alternatively, implementation is completely autonomous. The new security policy is automatically updated and/or installed in the one or more computing clouds associated with the entity. The automatic update may be performed, for example, in real time or near real time, such as within seconds.

At 718, Option 2: Implementation with IaC. IaC templates may be generated for the entities for them to add to their code pipelines. The IaC template may be automatically inserted into the code pipeline(s) of the common entity.

At 720, Option 3: Automatically generated step-by-step implementation instructions. The step-by-step implementation instructions may be generated in natural language. The instructions may be tailored to the current status of the computing cloud environments associated with the entity.

At 722, Option 4: assignment to team members, such as for manual implementation. Team members may be able to access their own version of the computing environment described herein, for example, to benefit from the prior implementation options. This may allow security teams to create security policies and/or assign the security policies to other users such as to a DevOps team, for installation. A ticket indicating an action item for the team to perform the installation may be automatically opened (e.g., in a ticket system) in response to selection of option 4, such as via a ticket integration mechanism. The team may perform the integration manually and/or using other tools.

Additional exemplary details for 716-722 are described, for example, with reference to 210-212 of FIG. 2.

At 724, monitoring, including of the cloud-specific security tools, may be performed to assure that the implementation is completed successfully. An indication of successful (or unsuccessful) implementation may be generated, for example, in real time or near real time, such as within minutes of completion of the implementation. The monitoring may be performed when the implementation options are asynchronous, for validation that the asynchronous implementation has been completed successfully. Additional exemplary details are described, for example, with reference to 214 of FIG. 2.

At 726, an indication that the policy implementation has been completed may be generated. Entities may access the security policy and/or cloud-specific security tools through a library to view the current implementation, and/or receive additional recommendations via the inbox. Additional exemplary recommendations may be generated and optionally presented, such as within the GUI. For example: 1. Changes to the cloud architecture associated with the entity (e.g., detected by the data fetches and/or analyzers). 2. Changes to the underlying security best practices (e.g., identified by ongoing conducted security research). 3. Post-implementation issues such as drift and/or exception requests. Additional exemplary details are described, for example, with reference to 214 of FIG. 2.

At 728, drift may be detected. Drift may be detected, for example, in response to changes of the cloud-specific security tool(s) externally to the generated recommendations and/or implementations performed herein, such as according to 716-726. For example, a user performs a further change to the security policy on their own, without using the GUI described herein. A notification of drift may be generated in real time, or near real time. In response to the notification of drift, the GUI may present options, for example, for accepting the change that triggered the drift, or re-implementing the security policy using one or more features described with reference to 708-726.

It is noted that drift detection may be implemented, for example, after the feature(s) described with reference to 424 of FIG. 4.

At 730, one or more features described with reference to 702-728 may be iterated. Additional exemplary details are described, for example, with reference to 214 of FIG. 2.

Features described with reference to 732-736 may be referred to as operationalization. After installing any tool (e.g., security tool), one or more of the following may be performed: At 732, monitoring (e.g., continuous, in real time, in near real time, at periodic internals, and/or according to other defined conditions) may be performed, optionally using the data fetches and/or analyzers described herein, for detection of drift, optionally in real time or near real time. Monitoring may be performed for obtaining findings of the tool and/or monitoring preventive impact of the tool (depending on the tool). Monitoring is different than drift which may occur, for example, when the user (associated with the entity) of the computing cloud changes security settings externally from approaches described herein, for example, directly with the provider of the computing cloud. In response to detection of drift, a notification may be generated and sent, for example, to the inbox of the user associated with the entity. The security team may be unware of the changes, until the notification is generated. A graphical presentation (e.g., within the GUI) may be generated indicating the drift, for example, how coverage by one or more cloud-specific security tools has changed. The GUI may include features enabling the user to take action, for example, automatic generation of an adapted security policy such as by iterating one or more features described with reference to 702-728.

At 734, the cloud-specific security tools may be managed (e.g., ongoing management). The management may be performed, for example, via a management page described herein, optionally presented within the GUI. For example, the security team (or other users) may be allowed to fine-tune settings.

At 736, tool and/or alert operationalization may be implemented. Recommendations to users indicating how best to leverage their cloud-specific security tools may be generated. For example, by connecting to ticketing systems, and/or initiating responses run books (such as invoking firewalls in response to attacks). While these recommendations may be surfaced within the relevant security category, this requires interoperability of other security categories (e.g., CNAPPP with firewalls) and/or may repeat the implementation mechanism.

Referring now back to FIG. 6, the exemplary method for automatic adaptation of a policy (e.g., policy management)

for provisioning of cloud-specific services and/or resources running on one or more computing clouds, is depicted.

The exemplary method described with reference to FIG. 6 includes, corresponds to, and/or may be implemented by, components of the system described with reference to FIG. 1 and/or the computing environment described with reference to FIG. 3, and/or one or more features described with reference to FIG. 2. The exemplary method described with reference to FIG. 6 is not meant to be necessarily limiting, and may be adapted by one skilled in the art accordingly, for example, according to the flow described with reference to FIG. 2, and/or by removing features, adding features, and/or adapting features.

At 802, fetchers collect information from each computing cloud associated with the entity. Exemplary collected information includes: number of accounts, regions, used cloud-specific services, used other services, network connectivity, billing, currently installed preventive policies, and the like. The fetches may be triggered, for example, periodically, upon request from the users, and/or each time the user takes action according to embodiments described herein. Additional exemplary details are described, for example, with reference to 202 of FIG. 2.

At 804, analyzers may triage the collected information. Recommendations may be generated according to the collected information. The recommendations may include one or more action items for potential preventive policies and/or rollout methodologies. Additional exemplary details are described, for example, with reference to 204 of FIG. 2.

At 806, recommendations and/or existing preventive policies may be mapped to a policy library. The policy library may allow entities to reason about these policies in short and/or clear objectives in natural language. This approach may be in contrast to, for example, identifying policy objectives, identifying the mechanisms through which they can be implemented, testing the policies users write and ensure that the policies achieve their desired objective, and doing this across multiple computing clouds (i.e., providers thereof).

At 808, recommendations across policies may be prioritized and/or surfaced via an inbox. The inbox may provide a centralized platform for viewing the policies, optionally prioritized. The inbox may be presented within a GUI.

Alternatively to 808, at 810, instead of using the inbox, a policy library may be used to locate a specific policy to manage.

At 812, a current status of the policy and/or recommendation for adapting the policy may be presented, within the GUI. The current status and/or recommendation may be presented graphically within the GUI, optionally on an organization chart. The current status may be presented using information from the fetches and/or analyzers. The current status and/or recommendation may be presented via a management page. The GUI may be designed for customization of the policy.

At 814, in response to selection of the adaptation to the policy, the potential impact of the adapted policy may be simulated. The simulation may be, for example, to determine whether the adapted policy will block any existing workloads? Had the adapted policy been implemented a month ago what would have been blocked?

At 816, an exception may be added to the policy.

At 818, the user may select to implement the new policy (i.e., adaption to the existing policy). Users may select from proposed implementation plans, for example, gradual rollout, tests, complete rollout, etc. . . .

At 820, the selected policy may be mapped to implementation mechanisms, for implementation across one or more different computing clouds. The selected policy may be prepared for implementation. Different implementation options may be provided, for example, presented on a display (e.g., within the GUI) for selection by the user. For example, a policy that no anonymous access is allowed in the computing cloud environment of the entity may be implemented, for example, using declarative policies, cloud-specific policies, custom organization policies, service control, and the like according to cloud-specific implementations. Additional exemplary details are described, for example, with reference to 208-210 of FIG. 2.

At 822, Option 1: Implementation may be in response to a click of a button, optionally a single click. Alternatively, implementation is completely autonomous. The new security policy may be automatically updated and/or installed in the one or more computing clouds associated with the entity. The automatic update may be performed, for example, in real time or near real time, such as within seconds.

At 824, Option 2: Implementation with IaC. IaC templates may be generated for the entities for them to add to their code pipelines. The IaC template may be automatically inserted into the code pipeline(s) of the common entity.

At 826, Option 3: Automatically generated step-by-step implementation instructions. The step-by-step implementation instructions may be generated in natural language. The instructions may be tailored to the current status of the computing cloud environments associated with the entity.

At 828, Option 4: assignment to team members, such as for manual implementation. Team members may be able to access their own version of the computing environment described herein, for example, to benefit from the prior implementation options. This may allow security teams to create security policies and/or assign the security policies to other users such as to a DevOps team, for installation. A ticket indicating an action item for the team to perform the installation may be automatically opened (e.g., in a ticket system) in response to selection of option 4, such as via a ticket integration mechanism. The team may perform the integration manually and/or using other tools.

Additional exemplary details for 822-828 are described, for example, with reference to 210-212 of FIG. 2.

At 830, the policy may be monitored to assure that the implementation is completed successfully. An indication of successful (or unsuccessful) implementation may be generated, for example, in real time or near real time, such as within minutes of completion of the implementation. The monitoring may be performed when the implementation options are asynchronous, for validation that the asynchronous implementation has been completed successfully. Additional exemplary details are described, for example, with reference to 214 of FIG. 2.

At 832, an indication that the policy implementation has been completed may be generated. Entities may access the policy through a library to view the current implementation, and/or receive additional recommendations, such as via the inbox. Additional exemplary recommendations for the policy may be generated and optionally presented, such as within the GUI. For example: 1. Changes to the cloud architecture associated with the entity (e.g., detected by the data fetches and/or analyzers). 2. Changes to the underlying best practices (e.g., identified by ongoing conducted research). 3. Post-implementation issues such as drift and/or exception requests. Additional exemplary details are described, for example, with reference to 214 of FIG. 2.

At 834, drift may be detected. Drift may be detected, for example, in response to changes of the cloud-specific security tool(s) externally to the generated recommendations and/or implementations performed herein, such as according to 822-828. For example, a user performs a further change to the security policy on their own, without using the GUI described herein. A notification of drift may be generated in real time, or near real time. In response to the notification of drift, the GUI may present options, for example, for accepting the change that triggered the drift, or re-implementing the security policy using one or more features described with reference to 802-832.

At 836, one or more features described with reference to 802-834 may be iterated. Additional exemplary details are described, for example, with reference to 214 of FIG. 2.

At 838, monitoring (e.g., continuous, in real time, in near real time, at periodic internals, and/or according to other defined conditions) may be performed, optionally using the data fetches and/or analyzers described herein, for detection of drift, optionally in real time or near real time. Drift may occur, for example, when the user (associated with the entity) of the computing cloud changes security settings externally from approaches described herein, for example, directly with the provider of the computing cloud. In response to detection of drift, a notification may be generated and sent, for example, to the inbox of the user associated with the entity. The security team may be unaware of the changes, until the notification is generated. A graphical presentation (e.g., within the GUI) may be generated indicating the drift, for example, how coverage by one or more cloud-specific security tools has changed. The GUI may include features enabling the user to take action, for example, automatic generation of an adapted security policy such as by iterating one or more features described with reference to 802-836.

At 840, the cloud-specific security tools may be managed (e.g., ongoing management). The management may be performed, for example, via a management page described herein, optionally presented within the GUI.

At 842, policy impact may be monitored. Actions (e.g., all actions) blocked by the policy may be monitored, optionally identified in real time or near real time. Integrations may be leveraged to identify management systems to identify the impacted user, and/or surfaced via the platform. A message and/or email may be sent to the relevant cloud user with the blocking reason and/or instructions on how to request exceptions.

It is to be understood that features described with reference to any one of FIGS. 4-6 may be implemented in other processes based on other FIGs. including FIG. 2, and/or by the systems and/or computing environments described with reference to FIG. 1 and/or FIG. 3.

Additional exemplary embodiments and/or features are now described.

Optionally, visibility into the user's security stack is provided. One or more processes may be designed to enhance the utilization of service capabilities by delivering usage optimization recommendations, end-to-end management features, and/or cost optimization insights. These processes may help ensure that the value of cloud service investments are maximized by operationalizing them effectively.

An example of a specific security category is for applying preventive policies across clouds to help user achieve secure-by-design multi-cloud environments. Other security categories may be for example, for managing network and application security, threat detection and response, securing AI workloads, etc. . . .

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing clouds will be developed and the scope of the term computing cloud is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatic provisioning of a plurality of cloud-specific security services on a plurality of computing clouds, comprising:
   instructing one or more processors to:
   collect a plurality of datasets by a plurality of code sensors monitoring a plurality of cloud-specific security services and/or security resources running in a plurality of computing clouds of a common entity, wherein the plurality of datasets include usage information specific to the cloud-specific security services and/or security resources, and exclude data stored within the plurality of cloud-specific security services and/or security resources;
   generate a technical architecture including a common security policy and/or security objective to implement across the plurality of security services and/or security resources on the plurality of computing clouds according to an analysis of the plurality of datasets including the usage information and excluding data stored within the plurality of cloud-specific security services and/or security resources;
   compute a plurality of architectural adaptations to the plurality of cloud-specific security services and/or security resources for normalizing current architectures to generate the technical architecture in each of the plurality of cloud-specific security services and/or security resources of the plurality of cloud-specific computing clouds for meeting the common security policy and/or security objective;
   generate a plurality of code-scripts according to the plurality of architectural adaptations for installation at corresponding cloud-specific security service and/or security resource running on each corresponding computing cloud for implementing the technical architecture across the plurality of computing clouds of the common entity;

in response to the installation of the plurality of code-scripts for implementing the technical architecture, analyze the plurality of datasets for detecting drift from the generated technical architecture, wherein the drift comprises unauthorized changes to the technical architecture and/or security policy implemented by the code-scripts, automatically re-compute the plurality of architectural adaptations for resolving the drift by determining modifications to the code-scripts necessary to restore compliance with the technical architecture, and automatically generate a plurality of adapted code-scripts according to the re-computed plurality of architectural adaptations; and automatically re-install the adapted code-scripts on the corresponding cloud-specific security service and/or security resource running on the corresponding computing clouds to resolve the drift.

2. The computer implemented method of claim 1, further comprising:

receiving a security objective written in a natural language from a user via a user interface, and generating the technical architecture for implementing the security objective across the plurality of security services and/or security resources.

3. The computer implemented method of claim 1, further comprising automatically installing each code-script of the plurality of code-scripts within the corresponding cloud-specific security service and/or security resource running on each corresponding computing cloud.

4. The computer implemented method of claim 1, wherein installing automatically is selected from: (i) application programming interface (API) invocation, and (ii) generation of infrastructure-as-code (IaC) dataset and creating a push request for the IaC.

5. The computer implemented method of claim 1, wherein the plurality of code-scripts are generated and/or installed in response to a single click by a user via a user interface.

6. The computer implemented method of claim 1, wherein the plurality of architectural adaptations are at a devop level.

7. The computer implemented method of claim 1, wherein the technical architecture defines a security objective, and the plurality of architectural adaptations are for one or more of: segmenting environments, creating preventive security policies configuring a firewall, deploying an application stack, provisioning a sandbox environment with limited access for testing, connections and/or dataflows between the plurality of cloud-specific security services and/or security resources, setting up autonomous response workflows for breaches, ensuring security tools are set up in conjunction with the types of cloud workflows set, setting up perimeter access for third-parties, and provisioning accounts and identities on behalf of customers.

8. The computer implemented method of claim 1, wherein the plurality of architectural adaptations include allocation of at least one cloud-specific security service and/or security resource.

9. The computer implemented method of claim 1, wherein the plurality of datasets collected by the plurality of sensors include at least one of: which entities are using each respective computing cloud, what each entity is doing in each computing cloud, when each entity used each respective computing cloud, and/or billing for correlation with usage.

10. The computer implemented method of claim 1, wherein the plurality of datasets collected by the plurality of sensors include at least one of: what code is running in each respective computing cloud, what third parties are accessing in each respective computing cloud, what applications are running in each respective computing cloud, at least one technical architecture, security service configurations, cloud usage patterns, billing configurations, and security resource configurations.

11. The computer implemented method of claim 1, wherein the plurality of code sensors are granted control-plane access, wherein data-plane access is denied for the plurality of code sensors, such that the plurality of code sensors are excluded from accessing data stored within the plurality of cloud-specific security services and/or security resources.

12. The computer implemented method of claim 1, wherein the plurality of code sensors are selected from: installing a stack on a management account which installs a dataset that includes permissions for rolling out to selected member account, adding an application to the respective computing cloud and running a script to grant permission to the application to collect a dataset, and granting permission to a security service account to access the respective computing cloud.

13. The computer implemented method of claim 1, wherein at least one code-script of the plurality of code-scripts is generated and/or installed as at least one of: (i) an infrastructure-as-code (IaC) template complying with at least one IaC format, (ii) via a pipeline, and (ii) via an integration with a software development kit (SDK) of a provider of a computing cloud running the respective cloud specific security service and/or security resource and calling a API for installing the at least one code-script.

14. The computer implemented method of claim 1, wherein at least one code-script of the plurality of code-scripts is installed.

15. The computer implemented method of claim 1, wherein the plurality of datasets are obtained by using a queue-based approach to query cloud service provider (CSP) application programming interfaces (APIs) for each account and/or region and/or security service and/or security resource, wherein each queue entry acts as an independent work process that is processed in parallel.

16. The computer implemented method of claim 1, wherein analyzing the plurality of datasets comprises performing multiple layer analysis for mapping an environment's policies, security service usage, and dependencies, aggregating outcomes of the multiple layer analysis, wherein the technical architecture is generating according to the aggregated outcomes.

17. The computer implemented method of claim 1, wherein analyzing comprises mapping the plurality of cloud-specific security services and/or security resources to categories associated with objectives, wherein the technical architecture is generated according to the mapped categories.

18. The computer implemented method of claim 1, further comprising simulating impact of installing the plurality of code-scripts, computing at least one metric according to the simulation, and automatically installing the plurality of code-scripts in response to the at least one metric meeting at least one target requirement.

19. The computer implemented method of claim 1, further comprising, in response to the installation of the plurality of code-scripts for implementing the technical architecture, and analyzing the plurality of datasets for detecting compliance with the generated technical architecture.

20. The computer implemented method of claim 1, wherein the analyzing the plurality of dataset is performed in near real-time for near-real time detection of drift.

21. The computer implemented method of claim 1, wherein the technical architecture comprises a common technical architecture to achieve across the plurality of security services on the plurality of computing clouds.

22. The computer implemented method of claim 1, wherein the plurality of computing clouds include a plurality of computing environments within a same provider or across a plurality of providers.

23. The computer implemented method of claim 1, further comprising:

connecting to an environment of the common entity for accessing customized security policies of the common entity;

mapping a first set of the customized security policies to at least one predefined template;

for a second set of the customized security policies which are non-mapped, analyzing the second set using machine learning models and/or artificial intelligence models to provide names and/or descriptions in natural language, and matching to similar customized security policies of the common entity, wherein the technical architecture is generated for the first set according to the at least one predefined template and for the second set according to the matches similar customized security policies.

24. A system for automatic provisioning of a plurality of cloud-specific security services on a plurality of computing clouds, comprising:

at least one processor executing a code for:

collecting a plurality of datasets by a plurality of code sensors monitoring a plurality of cloud-specific security services and/or security resources running in a plurality of computing clouds of a common entity, wherein the plurality of datasets include usage information specific to the cloud-specific security services and/or security resources, and exclude data stored within the plurality of cloud-specific security services and/or security resources;

generating a technical architecture including a common security policy and/or security objective to achieve across the plurality of security services and/or security resources on the plurality of computing clouds according to an analysis of the plurality of datasets including the usage information and excluding data stored within the plurality of cloud-specific security services and/or security resources;

computing a plurality of architectural adaptations to the plurality of cloud-specific security services and/or security resources for normalizing current architectures to generate the technical architecture in each of the plurality of cloud-specific security services and/or or security resources of the plurality of cloud-specific computing clouds for meeting the common security policy and/or security objective;

generating a plurality of code-scripts according to the plurality of architectural adaptations for installation at corresponding cloud-specific security service and/or or security resource running on each corresponding computing cloud for implementing the technical architecture across the plurality of computing clouds of the common entity;

in response to the installation of the plurality of code-scripts for implementing the technical architecture, analyzing the plurality of datasets for detecting drift from the generated technical architecture, wherein the drift comprises unauthorized changes to the technical architecture and/or security policy implemented by the code-scripts, automatically re-computing the plurality of architectural adaptations for resolving the drift by determining modifications to the code-scripts necessary to restore compliance with the technical architecture, and automatically generating a plurality of adapted code-scripts according to the re-computed plurality of architectural adaptations; and automatically re-installing the adapted code-scripts on the corresponding cloud-specific security service and/or security resource running on the corresponding computing clouds to resolve the drift.

25. A non-transitory medium storing program instructions for automatic provisioning of a plurality of security services on a plurality of computing clouds, which when executed by at least one processor, cause the at least one processor to:

collect a plurality of datasets by a plurality of code sensors monitoring a plurality of cloud-specific security services and/or security resources running in a plurality of computing clouds of a common entity, wherein the plurality of datasets include usage information specific to the cloud-specific security services and/or security resources, and exclude data stored within the plurality of cloud-specific security services and/or security resources;

generate a technical architecture including a common security policy and/or security objective to achieve across the plurality of security services and/or security resources on the plurality of computing clouds according to an analysis of the plurality of datasets including the usage information and excluding data stored within the plurality of cloud-specific security services and/or security resources;

compute a plurality of architectural adaptations to the plurality of cloud-specific security services and/or security resources for normalizing current architectures to generate the technical architecture in each of the plurality of cloud-specific security services and/or security resources of the plurality of cloud-specific computing clouds for meeting the common security policy and/or security objective;

generate a plurality of code-scripts according to the plurality of architectural adaptations for installation at corresponding cloud-specific security service and/or security resource running on each corresponding computing cloud for implementing the technical architecture across the plurality of computing clouds of the common entity;

in response to the installation of the plurality of code-scripts for implementing the technical architecture, wherein the drift comprises unauthorized changes to the technical architecture and/or security policy implemented by the code-scripts, analyze the plurality of datasets for detecting drift from the generated technical architecture, automatically re-compute the plurality of architectural adaptations for resolving the drift by determining modifications to the code-scripts necessary to restore compliance with the technical architecture, and automatically generate a plurality of adapted code-scripts according to the re-computed plurality of architectural adaptations; and automatically re-install the adapted code-scripts on the corresponding cloud-specific security service and/or security resource running on the corresponding computing clouds to resolve the drift.

* * * * *